US012682469B2

(12) United States Patent
Ishimura

(10) Patent No.: US 12,682,469 B2
(45) Date of Patent: Jul. 14, 2026

(54) INFORMATION PROCESSING SYSTEM, INFORMATION PROCESSING METHOD, AND PROGRAM

(71) Applicant: Sony Group Corporation, Tokyo (JP)

(72) Inventor: Yuji Ishimura, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 318 days.

(21) Appl. No.: 18/692,844

(22) PCT Filed: Feb. 17, 2022

(86) PCT No.: PCT/JP2022/006339
§ 371 (c)(1),
(2) Date: Mar. 18, 2024

(87) PCT Pub. No.: WO2023/047621
PCT Pub. Date: Mar. 30, 2023

(65) Prior Publication Data
US 2024/0394897 A1 Nov. 28, 2024

(30) Foreign Application Priority Data

Sep. 24, 2021 (JP) ................................. 2021-155854

(51) Int. Cl.
*G06K 9/00* (2022.01)
*A63B 24/00* (2006.01)
(Continued)

(52) U.S. Cl.
CPC .......... *G06T 7/251* (2017.01); *A63B 24/0006* (2013.01); *G06T 7/73* (2017.01);
(Continued)

(58) Field of Classification Search
USPC ........ 382/100, 103, 106–107, 117–118, 156, 382/162, 168, 173, 181, 254, 305, 312;
(Continued)

(56) References Cited

U.S. PATENT DOCUMENTS

| | | | | |
|---|---|---|---|---|
| 12,103,162 B2 * | 10/2024 | Mizuno | ................... | G06F 3/017 |
| 2008/0256450 A1 * | 10/2008 | Takakura | ................ | G06T 11/60 |
| | | | | 715/721 |

(Continued)

FOREIGN PATENT DOCUMENTS

| | | | |
|---|---|---|---|
| JP | 4166087 B2 | 10/2008 | |
| JP | 4594157 B2 | 12/2010 | |

(Continued)

OTHER PUBLICATIONS

International Search Report and Written Opinion mailed on May 10, 2022, received for International Application No. PCT/JP2022/006339, filed on Feb. 17, 2022, 11 pages including English Translation.

(Continued)

*Primary Examiner* — Seyed H Azarian
(74) *Attorney, Agent, or Firm* — XSENSUS LLP

(57) ABSTRACT

An information processing system includes a state machine and a motion analysis unit. The state machine detects, based on posture information on a target extracted from moving image data, a plurality of phases included in a series of motions of the target. The motion analysis unit analyzes, by using the posture information, the motion of the target for each phase.

28 Claims, 13 Drawing Sheets

(51) Int. Cl.

| | | |
|---|---|---|
| *G06T 7/246* | (2017.01) | |
| *G06T 7/73* | (2017.01) | |

(52) U.S. Cl.
CPC ... *A63B 2024/0015* (2013.01); *A63B 2220/05* (2013.01); *A63B 2220/806* (2013.01); *A63B 2230/62* (2013.01); *G06T 2207/10016* (2013.01); *G06T 2207/30196* (2013.01)

(58) Field of Classification Search
USPC ..................................... 348/220.1; 715/721
See application file for complete search history.

(56) References Cited

U.S. PATENT DOCUMENTS

| | | | | |
|---|---|---|---|---|
| 2015/0326784 | A1* | 11/2015 | Hayashi | H04N 23/667 |
| | | | | 348/220.1 |
| 2017/0337428 | A1* | 11/2017 | Shimauchi | H04N 5/91 |
| 2018/0039825 | A1* | 2/2018 | Fujikake | G06V 20/47 |
| 2018/0324455 | A1* | 11/2018 | Nakagami | H04N 19/577 |
| 2021/0209348 | A1* | 7/2021 | Tusch | G06V 40/20 |

FOREIGN PATENT DOCUMENTS

| | | | |
|---|---|---|---|
| JP | 5547968 | B2 | 7/2014 |
| JP | 2015-150226 | A | 8/2015 |
| JP | 6045139 | B2 | 12/2016 |
| JP | 6289165 | B2 | 3/2018 |
| JP | 6447609 | B2 | 1/2019 |
| JP | 2019-025348 | A | 2/2019 |
| JP | 2020-141806 | A | 9/2020 |
| JP | 2021-049319 | A | 4/2021 |
| JP | 2021-076887 | A | 5/2021 |
| JP | 2021-124748 | A | 8/2021 |
| WO | 2016/056449 | A1 | 4/2016 |
| WO | WO-2018214528 | A1 | 11/2018 |

OTHER PUBLICATIONS

Matsumoto et al.,"Motor Learning Support System by the Feedback of Proficiency", IEICE Technical Report, The Institute of Electronics, Information and Communication Engineers, vol. 113, No. 470, Feb. 27, 2014, 9 pages including English Abstract.

Gaoyue Sun, "Golf Swing Correction Based on Deep Learning Body Posture Recognition", Jul. 28, 021, pp. 72-76, XP093232341.

* cited by examiner

FIG.6

INFORMATION PROCESSING SYSTEM, INFORMATION PROCESSING METHOD, AND PROGRAM

CROSS-REFERENCE OF RELATED APPLICATIONS

This application is a national stage of International Patent Application No. PCT/JP2022/006339, filed Feb. 17, 2022, which claims priority from Japanese Patent Application No. 2021-155854, filed Sep. 24, 2021, the entire contents of each are incorporated herein by reference.

FIELD

The present invention relates to an information processing system, an information processing method, and a program.

BACKGROUND

In recent years, a motion analysis method using a posture estimation technique has been proposed (for example, refer to Patent Literatures 1 to 8). The posture estimation technique is a technique of extracting a plurality of key points (a plurality of feature points indicating a shoulder, an elbow, a wrist, a waist, a knee, an ankle, and the like when a target is a human) from an image of a target person or a target object and estimating a posture of the target based on relative positions of the key points. The posture estimation technique is expected to be applied in a wide range of fields such as learning support in sports, healthcare, automatic driving, and danger prediction.

CITATION LIST

Patent Literature

Patent Literature 1: JP 4166087 B2
Patent Literature 2: JP 4594157 B2
Patent Literature 3: JP 5547968 B2
Patent Literature 4: JP 6045139 B2
Patent Literature 5: JP 2021-049319 A
Patent Literature 6: JP 2020-141806 A
Patent Literature 7: JP 6447609 B2
Patent Literature 8: JP 6289165 B2

SUMMARY

Technical Problem

When motion analysis is performed using a target moving image, it is desirable to analyze a series of motions for each phase serving as a point. The series of motions of the target can be regarded as a combination of a plurality of characteristic motions (phases). When the analysis is performed for each phase, the series of motions can be accurately analyzed. In the conventional method, classification of motions by phase is not performed. Therefore, it is not possible to accurately evaluate the series of motions in an overall manner.

Therefore, the present disclosure proposes an information processing system, an information processing method, and a program capable of accurately evaluating a series of motions in an overall manner while appropriately extracting a phase serving as a point.

Solution to Problem

According to the present disclosure, an information processing system is provided that comprises: a state machine configured to detect, based on posture information on a target extracted from moving image data, a plurality of phases included in a series of motions of the target; and a motion analysis unit configured to analyze, by using the posture information, the motion of the target for each phase. According to the present disclosure, an information processing method in which an information process of the information processing system is executed by a computer, and a program for causing the computer to execute the information process of the information processing system, are provided.

BRIEF DESCRIPTION OF DRAWINGS

FIG. 6 is a diagram illustrating a specific example of the preprocessing.

DESCRIPTION OF EMBODIMENTS

Figure 1:
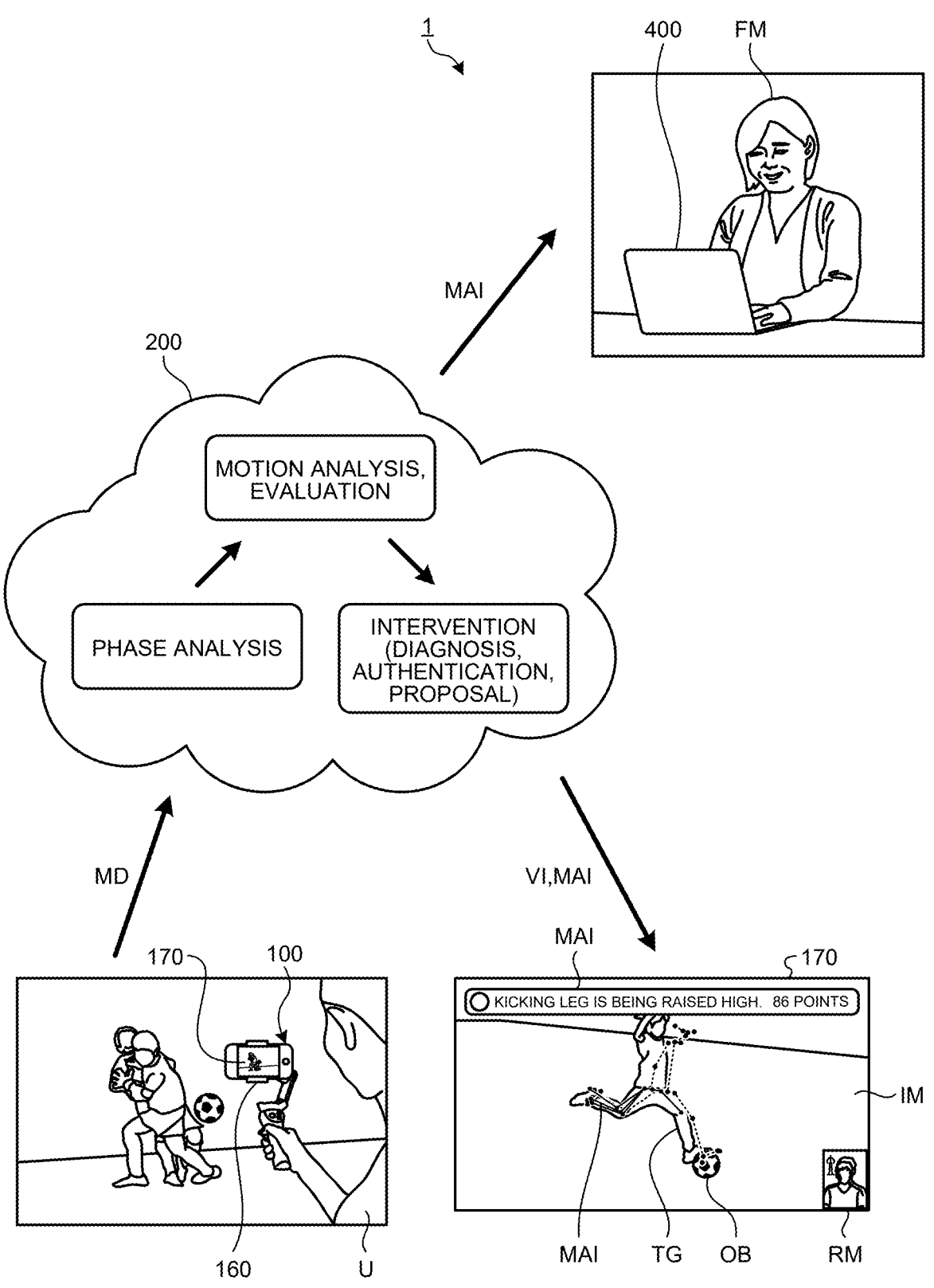
FIG. 1 is a diagram illustrating an example of a motion analysis service.

Hereinafter, embodiments of the present disclosure will be described in detail with reference to the drawings. In the following embodiments, the same parts will be denoted by the same reference numerals, and redundant description will be omitted.

[1. Outline of motion analysis service]
[2. Configuration of information processing system]
[3. Information processing method]
[3-1. Outline of motion analysis processing]
[3-2. Moving image acquisition processing]
[3-3. Analysis/evaluation processing]
[4. Functional configuration related to analysis/intervention processing]
[5. Specific example of motion analysis]
[6. Variations of system configuration]
[7. Effects]

1. Outline of Motion Analysis Service

FIG. 1 is a diagram illustrating an example of a motion analysis service.

The motion analysis service is a service that analyzes a motion of a target TG based on moving image data CD and presents appropriate intervention information VI. The motion analysis service is applicable to a wide range of fields such as learning support in sports, healthcare, automatic driving, and danger prediction. The motion to be analyzed is appropriately defined according to a field to which the motion analysis service is applied, the purpose of the analysis, and the like.

For example, in the field of learning support in sports, a specific motion corresponding to a coaching target (soccer shooting, tennis serving, golf swing, and the like) is defined as a target to be analyzed. In the healthcare field, motions such as a fitness motion such as Yoga, functional recovery training, motion training/walking training, a joint range of motion training, and muscle strengthening training, a motion specified as existing activities of daily living (ADL), and a motion such as walking are defined as targets to be analyzed. In the field of automatic driving, a motion of a pedestrian is defined as a target to be analyzed. In the field of danger prediction, a motion in an abnormal posture state (lying, crouching down for a long time, a motion of a drunken person, a suspicious behavior, tumbling, and the like) is defined as a target to be analyzed.

Hereinafter, an example in which the motion analysis service is applied to the field of learning support in sports and fitness will be described.

The motion analysis service is performed by an information processing system 1 as illustrated in FIG. 1. The information processing system 1 includes a client terminal 100, a motion analysis server 200, a trainer terminal 300, a family terminal 400, and a service provider server 500. The client terminal 100, the motion analysis server 200, the trainer terminal 300, the family terminal 400, and the service provider server 500 are connected to each other via a network NW (refer to FIG. 9). It is noted that, in the example of FIG. 1, the information processing system 1 includes the trainer terminal 300, the family terminal 400, and the service provider server 500, but these configurations are not essential.

The client terminal 100 is an information terminal such as a smartphone, a tablet terminal, and a notebook computer. The client terminal 100 is held by a client requesting the motion analysis of the target TG. The client is, for example, the target TG or a family FM of the target TG. The client terminal 100 transmits moving image data MD showing a video of the target TG related to sports and fitness to the motion analysis server 200.

The motion analysis server 200 analyzes the motion of the target TG based on the moving image data MD. A series of motions of the target is regarded as a combination of a plurality of characteristic motions arranged in the time axis. The motion analysis server 200 extracts individual characteristic motions as phases. A boundary between the phases is defined based on a predetermined index. The motion analysis server 200 evaluates the series of motions by performing motion analysis for each phase.

The motion analysis server 200 generates analysis information MAI indicating an evaluation result and transmits the analysis information MAI to the client terminal 100, the trainer terminal 300, and the family terminal 400. The target TG, a trainer, and the family FM can grasp the motion state of the target TG based on the transmitted analysis information MAI.

The analysis information MAI includes the evaluation result based on comparison between a motion of the target TG and a motion of a model. The trainer diagnoses the target TG based on the analysis information MAI received by the trainer terminal 300. The trainer transmits diagnosis information indicating a diagnosis result to the motion analysis server 200 via the trainer terminal 300. The motion analysis server 200 transmits the diagnosis information together with the analysis information MAI to the service provider server 500.

The service provider server 500 extracts product sales information such as a training machine suitable for the target TG from a product sales database based on the analysis information MAI and/or the diagnosis information, and transmits the product sales information to the motion analysis server 200. The motion analysis server 200 generates intervention information VI for the target TG based on the analysis information MAI, the diagnosis information, and the product sales information, and transmits the intervention information VI to the client terminal 100. The intervention information VI includes the diagnosis result of the target TG, authentication of exercise ability, various proposals for improving the motion of the target TG, and the product sales information.

2. Configuration of Information Processing System

Figure 2:
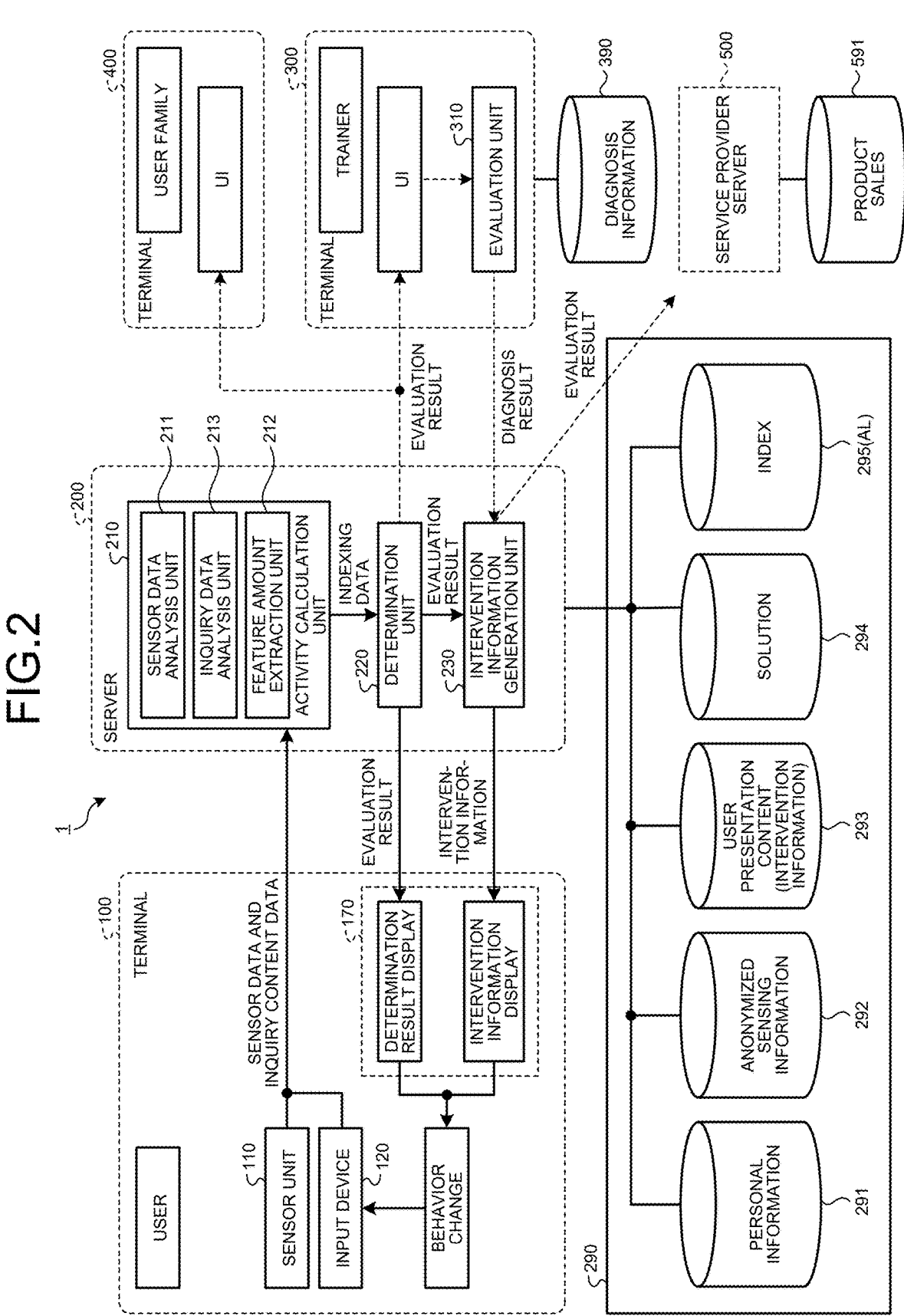
FIG. 2 is a block diagram illustrating an example of a functional configuration of an information processing system.

FIG. 2 is a block diagram illustrating an example of a functional configuration of the information processing system 1.

The client terminal 100 includes a sensor unit 110, an input device 120, and a display device 170. The sensor unit 110 tracks the activity of the target TG and collects an activity amount and exercise data of the target TG. The exercise data includes the moving image data MD showing the exercise state of the target TG. The input device 120 includes various input devices capable of inputting inquiry data for health screening. The display device 170 displays various determination results (the analysis information MAI) and the intervention information VI obtained by the motion analysis of the target TG.

For example, the sensor unit 110 includes a fitness tracker, a camera 160, a global positioning system (GPS), an acceleration sensor, and a gyro sensor. The input device 120 includes a touch panel, a keyboard, a mouse, an eye tracking device, and a voice input device. The display device 170 includes a liquid crystal display (LCD) or an organic light emitting diode (OLED).

The client terminal 100 transmits the vital data, the exercise data, and the inquiry data of the target TG to the motion analysis server 200. The motion analysis server 200 performs the motion analysis of the target TG based on various pieces of data acquired from the client terminal 100.

The motion analysis server 200 includes an activity calculation unit 210, an evaluation unit 220, an intervention information generation unit 230, and a storage device 290.

The activity calculation unit 210 calculates activity information on the target TG based on sensor data and the inquiry data. The activity information includes various types of information indicating the activity of the target TG, such as the activity amount (the number of steps, a heart rate, a calorie consumption, and the like) of the target TG and an exercise situation.

For example, the activity calculation unit 210 includes a sensor data analysis unit 211, a feature amount extraction unit 212, and an inquiry data analysis unit 213. It is noted that, in the example of FIG. 2, the inquiry data analysis unit 213 is included in the activity calculation unit 210, but the inquiry data analysis unit 213 is not necessarily required as long as there is only an instruction of sports. In this case, it is also unnecessary to input the inquiry data.

The sensor data analysis unit 211 detects the activity amount of the target TG based on a sensing result of a fitness sensor. The sensor data analysis unit 211 analyzes the moving image data MD showing the exercise state of the target TG, and extracts posture information HPI (refer to FIG. 6) of the target TG.

The feature amount extraction unit 212 extracts a feature amount from the posture information HPI based on an index stored in an index database 295. The index database 295 stores an index used to perform motion analysis for each type of exercise. The index includes various types of information for performing the motion analysis. One or more determination items to be subjected to the motion analysis are associated with an individual exercise item. In the storage device 290 (the index database 295), an image capturing condition of a moving image, a piece of definition information on a feature amount, and a motion analysis algorithm AL are stored for each determination item as an index for performing the motion analysis.

For example, in the learning support in sports, different determination items and indices of the motion analysis are used for each sport item. In the example of the soccer learning support, dribbling, shooting, heading, and the like are defined as basic motions. In the index database 295, individual basic motions are defined as the determination items. The moving image data MD is acquired for each determination item, and the motion analysis is also performed for each determination item.

The inquiry data analysis unit 213 diagnoses a lifestyle and an in-vivo state (body weight, body fat, visceral fat, basal metabolism, muscle mass, blood flow, skin age, and the like) based on the inquiry data. The inquiry data can include information such as a disease state, a medication history, a pain site, and a portion desired to be improved. A diagnosis result is used to determine whether the exercise is possible. The inquiry data analysis unit 213 determines whether it is appropriate to cause the target TG to perform exercise based on the diagnosis result. In a case where it is determined that an excessive burden is imposed on the target TG or it is not appropriate for the target TG to perform exercise, the inquiry data analysis unit 213 notifies the client terminal 100 of an alert for stopping the exercise or encouraging a check by a doctor. The inquiry data analysis unit 213 may make an inquiry to the trainer terminal 300 instead of notifying the client terminal 100 of the alert.

The evaluation unit 220 analyzes the motion of the target TG based on the feature amount extracted by the feature amount extraction unit 212 and the motion analysis algorithm AL stored in the index database 295. For example, the evaluation unit 220 classifies a series of motions of the target TG recorded in the moving image data MD into a plurality of phases based on the motion analysis algorithm AL, and analyzes the motion for each phase. A method of detecting the boundary between the phases and a method of evaluating the motion of each phase are defined in the motion analysis algorithm AL. The evaluation unit 220 generates the analysis information MAI indicating an evaluation result of the series of motions.

The intervention information generation unit 230 generates the intervention information VI for the target TG based on the analysis information MAI. The intervention information VI includes information (determination information) serving as a determination material for encouraging the target TG to improve the motion thereof or a training plan of the target TG.

The intervention information generation unit 230 can extract one or more symptoms of the target TG from the analysis information MAI, and determine the training plan based on a priority determined for each symptom and a weight of each symptom. In addition to the analysis information MAI, the intervention information generation unit 230 can also determine the training plan with reference to the information such as the inquiry data.

The symptom includes a target TG-specific habit compared to a target motion. For example, when a ball is thrown, a form in which an elbow is moved forwards and then an arm is swung down is a correct form. However, there are some people who suddenly throw a ball without moving their elbows forwards like shot put. By classifying forms, symptoms can be classified. An algorithm for symptom definition and symptom classification is defined in the index database 295. In a case where a plurality of symptoms are detected in the target TG, the intervention information generation unit 230, for example, presents the training plan based on a symptom having the highest priority.

The priority of symptoms and the training plan for each symptom are stored in a solution database 294. In the solution database 294, one or more training plans are associated with each symptom. The intervention information generation unit 230 can present another training plan associated with the symptom based on the progress of improvement of the symptom.

The intervention information generation unit 230 determines a current exercise ability level of the target TG based on the analysis information MAI. Level information is used for comparison with other sports members having similar exercise ability, age, or sports history, authentication processing for improvement of skills, and the like. For example, the intervention information generation unit 230 generates authentication information for authenticating the current level of the target TG.

The storage device 290 can have a personal information database 291, an anonymized sensing information database 292, an intervention information database 293, the solution database 294, and the index database 295.

The personal information database 291 stores information on the target TG individual, such as an age, a height, a weight, a medical history, a medication, and the like of the target TG. In the example of FIG. 2, personal information is stored as a database in the motion analysis server 200. However, the personal information on the target TG may be stored in the client terminal 100.

The anonymized sensing information database 292 stores past sensing data of the target TG used by the activity calculation unit 210. The past sensing data is stored as anonymized data in association with anonymized information such as an age, a sex, and a disease.

The intervention information database 293 stores the intervention information VI generated by the intervention information generation unit 230 in association with the activity information on the target TG.

The solution database 294 stores a solution for each sport item used by the intervention information generation unit 230. For example, contents such as a piece of advice, an educational content, and a training/exercise program are stored for each item. Each content may be stored in association with an evaluation result or a diagnosis result. As a result, a piece of appropriate advice and an appropriate content according to the state of the target TG are provided.

The index database 295 stores an index used by the evaluation unit 220. The index database 295 includes the definition information on the feature amount and the motion analysis algorithm AL using the feature amount as an index of the motion analysis. The motion analysis algorithm AL may be based on a specific threshold value, or may be based on a learning model on which machine learning is performed.

The trainer terminal 300 is an information terminal such as a smartphone, a tablet terminal, a notebook computer, and a desktop computer. The trainer terminal 300 includes an evaluation unit 310 and a diagnosis information database 390. The trainer terminal 300 receives and displays the health information on the target TG, the analysis information MAI, the information on the symptom, and the like transmitted from the motion analysis server 200.

The evaluation unit 310 diagnoses the current exercise state of the target TG based on the information input by the trainer, the health information and the analysis information MAI of the target TG received by the motion analysis server 200, and the information stored in the diagnosis information database 390, and transmits a diagnosis result thereof and a piece of advice according to the diagnosis result to the motion analysis server 200. The diagnosis result and the advice according to the diagnosis result may be directly transmitted to the client terminal 100 held by the target TG without passing through the motion analysis server 200.

The diagnosis information database 390 stores the diagnosis information obtained by diagnosing the target TG in the past, and the like.

Since the health information, the evaluation result, and the like of the target TG are transmitted to the trainer terminal 300, the trainer can know the health state and the behavior change of the target TG even if the trainer lives far away from the target TG. Accordingly, it is possible to enable the trainer to remotely diagnose the current exercise state of the target TG and provide the diagnosis result.

The family terminal 400 is an information terminal such as a smartphone, a tablet terminal, a notebook computer, and a desktop computer. The family terminal 400 receives and displays the activity information on the target TG, the analysis information MAI, and the like transmitted from the motion analysis server 200. As a result, the family FM of the target TG can know the activity state and the behavior change of the target TG even if the family FM lives far away from the target TG.

The service provider server 500 includes a product sales database 591. The product sales database 591 stores product sales information PSI of health foods and the like suitable for each piece of the health information and the analysis information MAI. The service provider server 500 receives the health information on the target TG, the analysis information MAI, the information on the symptom, and the like transmitted from the motion analysis server 200. The service provider server 500 searches the product sales database 591 for the product sales information corresponding to the received health information on the target TG, analysis information MAI, and information on the symptom. The service provider server 500 transmits the searched product sales information to the motion analysis server 200.

Since the health information, the analysis information MAI, and the like of the target TG are transmitted to the service provider server 500, the service provider can provide the target TG with the product sales information such as a recommended training machine based on the health state and the behavior change of the target TG. It is desirable that the health information on the target TG, the analysis information MAI, and the information on the symptom received by the trainer terminal 300 and the service provider server 500 be anonymized.

In the example of FIG. 2, the activity information is calculated in the motion analysis server 200, and the analysis information MAI and the intervention information VI are provided. However, a server that calculates the activity information and a server that evaluates the motion and provides the analysis information MAI and the intervention information VI may be configured separately. Furthermore, although the service provider server 500 has been described as a server different from the motion analysis server 200, the motion analysis server 200 and the service provider server 500 may be formed to be integrated with each other.

Furthermore, in the example of FIG. 2, an example in which the motion analysis server 200 includes various databases has been described. However, a database server including various databases may be separately provided. Further, each database in the storage device 290 may be managed by a server different from the motion analysis server 200.

3. Information Processing Method

3-1. Outline of Motion Analysis Processing

Figure 3:
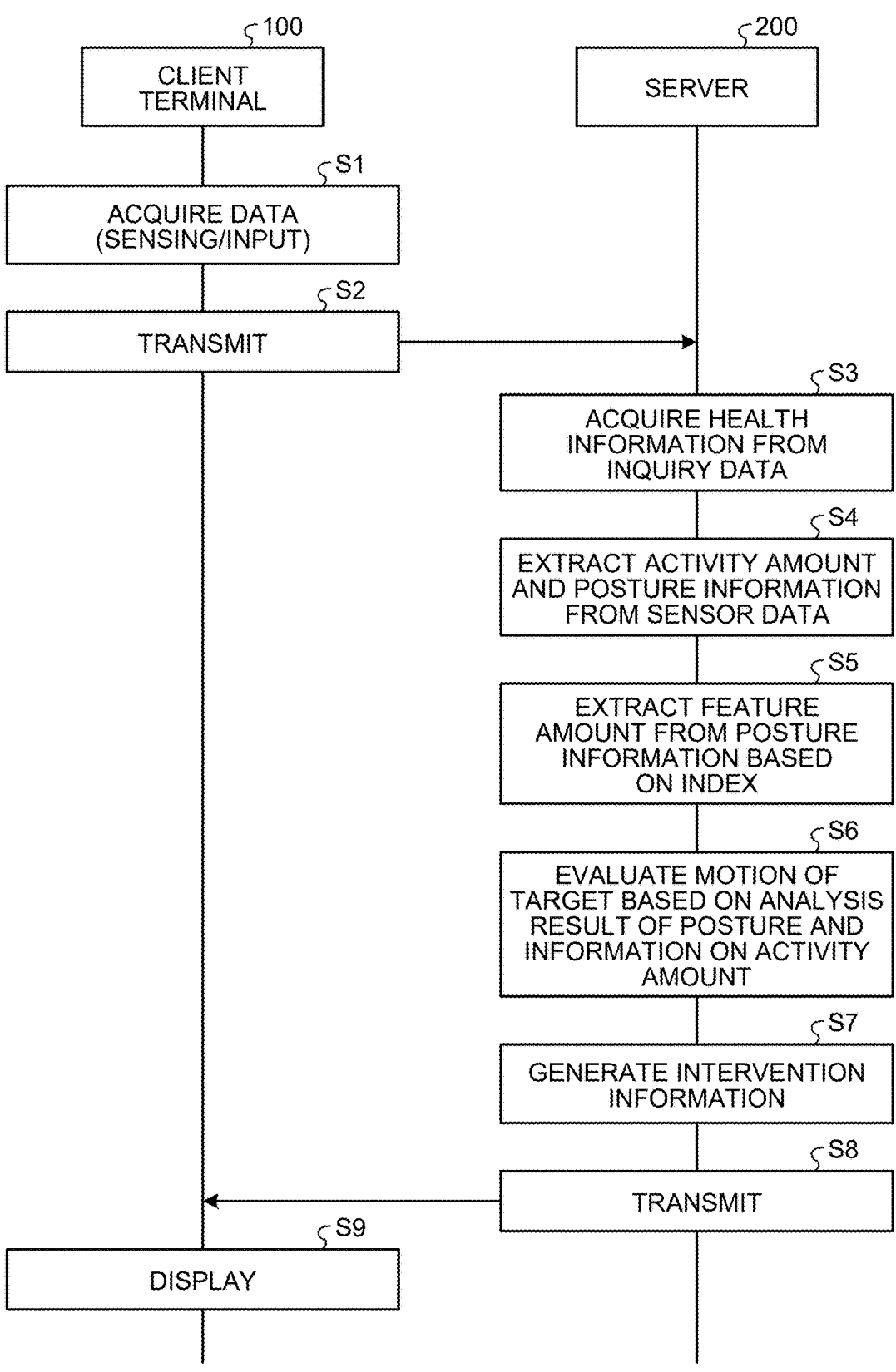
FIG. 3 is a flowchart illustrating an outline of motion analysis processing.

FIG. 3 is a flowchart illustrating an outline of motion analysis processing.

The client terminal 100 acquires sensor data and inquiry data from the sensor unit 110 and the input device 120 (Step S1). The client terminal 100 transmits the acquired sensor data and inquiry data to the motion analysis server 200 (Step S2).

The inquiry data analysis unit 213 extracts the health information on the target TG from the inquiry data (Step S3). The sensor data analysis unit 211 extracts, from the sensor data, the activity amount of the target TG and the posture information HPI of the target TG during exercise (Step S4).

The feature amount extraction unit 212 extracts, from the index database 295, an index (the definition information on the feature amount and the motion analysis algorithm AL) of motion analysis according to a type of exercise serving as a determination item. The feature amount extraction unit 212 extracts the feature amount from the posture information HPI based on the definition information on the feature amount (Step S5).

The evaluation unit 220 applies data of the extracted feature amount to the motion analysis algorithm AL to analyze the motion of the target TG. The motion analysis is performed for each phase of the motion. The evaluation unit 220 classifies the motion of one example of the target TG into a plurality of phases based on the motion analysis algorithm AL. In the case of fitness, the evaluation unit 220 can perform the motion analysis in consideration of the information on the activity amount. The evaluation unit 220 evaluates the series of motions of the target TG based on the analysis result of the motion for each phase, and generates the analysis information MAI indicating the evaluation result (Step S6).

The intervention information generation unit 230 acquires diagnosis information and product sales information related to the analysis information MAI from the trainer terminal 300 and the service provider server 500. The intervention information generation unit 230 generates the intervention information VI for intervening in the target TG based on the analysis information MAI, the diagnosis information, the information on the symptom, and the product sales information (Step S7).

The intervention information generation unit 230 transmits the generated intervention information VI to the client terminal 100 (Step S8). The client terminal 100 displays the intervention information VI on the display device 170, and causes the target TG to recognize the exercise situation (Step S9). As a result, a change in the behavior of the target TG is encouraged.

3-2. Moving Image Acquisition Processing

Figure 4:
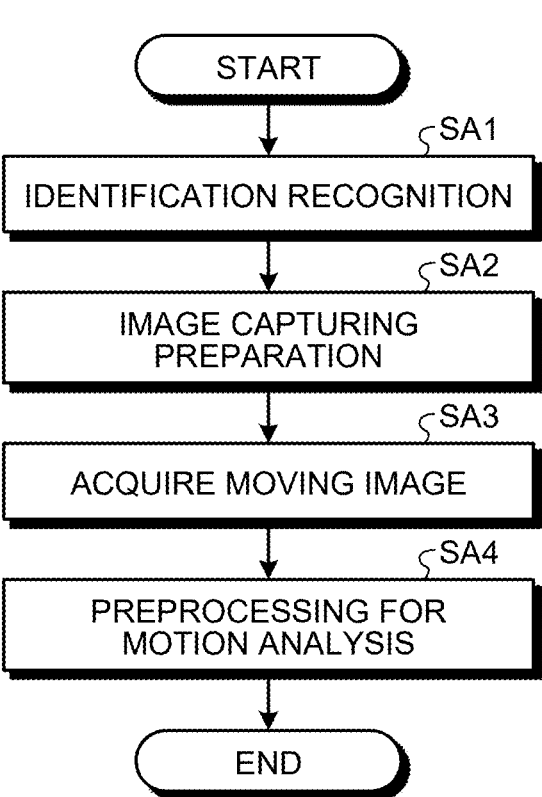
FIG. 4 is a flowchart illustrating an example of moving image acquisition processing.

FIG. 4 is a flowchart illustrating an example of moving image acquisition processing.
<Step SA1: Identification Recognition>

The client terminal 100 recognizes a person (the target TG) to be subjected to the motion analysis. The target TG may be recognized as a person at the center of an image capturing field of view of the camera 160, or the target TG may be authenticated by account information, face authentication, fingerprint authentication, or the like.
<Step SA2: Image Capturing Preparation>

The client terminal 100 determines whether exercise is possible based on the inquiry data. When it is determined that the exercise is possible, the client terminal 100 determines a determination item and an image capturing condition as preparation for image capturing.

The determination item is selected by selection of the target TG or the trainer. When a training item, which is a target to be analyzed, is set in the training plan, the set training item may be determined as the determination item. In the present disclosure, the determination item is determined based on, for example, user input information (selection of the target TG).

The client terminal 100 extracts the image capturing condition associated with the determination item from the index database 295, and notifies the target TG of the image capturing condition using a voice or a video. The image capturing condition includes a reference for a positional relationship between the target TG and the camera 160, a position (for example, the coordinates of both shoulders and the position of the center line of the skeleton) of the target TG in the angle of view, and the like. If the client terminal 100 determines that the image capturing position of the camera 160 does not satisfy the above reference, the client terminal 100 issues a notification to the target TG using a voice or a video.

The determination as to whether the image capturing position satisfies the above-described reference may be performed by another analysis device such as the motion analysis server 200. A part of the determination (for example, posture estimation only) may be performed by the client terminal 100 and the rest of the determination may be performed by another analysis device. Further, when the positional relationship between the target TG and the camera 160 is detected using a ToF sensor or the like, the video of the camera 160 may be corrected so as to satisfy the above-described reference based on the detected positional relationship.

The client terminal 100 can detect its own horizontality using a gyro sensor or the like, and can issue a notification to the target TG if the client terminal 100 is inclined from the horizontal. When the motion of the target TG is analyzed, it may be necessary to accurately know in which direction and how much the posture of the target TG is inclined from the vertical direction depending on the determination item. In this case, as a preparation prior to execution of the image capturing, the target TG is caused to adjust the horizontality of the client terminal 100.

When it is determined that the target TG cannot be accurately separated from the background by the image analysis, the client terminal 100 can issue a notification to the target TG. When the color of the clothes and the color of the background (for example, the wall) are the same, or when the color of the hair and the color of the background (for example, the dark corridor) are the same, the target TG cannot be accurately separated from the background by the image analysis. Even when another person exists in the background of the target TG, the target TG and the another person cannot be analyzed separately. If the target TG cannot be separated from the background, the posture information HPI of the target TG cannot be accurately extracted. Therefore, a notification is issued to the target TG, and the image capturing position and the illumination state are adjusted.
<Step SA3: Moving Image Acquisition>

When the image capturing condition is optimized, the client terminal 100 captures a moving image. The client terminal 100 may capture an assessment moving image before capturing the moving image related to the determination item. The assessment moving image means a moving image showing basic motions such as standing up, walking, going up and down stairs, and getting up, which are acquired to analyze an exercise ability of the target TG. The assessment moving image is used as a determination material to analyze the health condition of the target TG together with the inquiry data.

An instruction to start and end image capturing of the moving image can be input by voice. Alternatively, poses at the time of start and end of the motion may be detected by image analysis, and processing of starting and ending image capturing of the moving image may be automatically performed when these poses are detected.
<Step SA4: Preprocessing For Motion Analysis>

When the moving image related to the determination item is captured, the client terminal 100 performs preprocessing of performing motion analysis using the motion analysis server 200 as necessary.

When the motion of the target TG is analyzed using the moving image data MD, the number of frame images that actually need analysis is not so large (for example, one or more to ten or less per phase). If all the frame images included in the moving image data MD are analyzed by the high performance motion analysis server 200, analysis costs will increase. Therefore, as the preprocessing for the motion analysis, the client terminal 100 extracts a specific motion scene (hereinafter referred to as a "specific scene") that is expected to include an important frame image indicating the motion in the phase. The specific scene is extracted corresponding to each phase. The client terminal 100 transmits only a frame image of the specific scene to the motion analysis server 200.

For example, the client terminal 100 analyzes the moving image data MD acquired in a low image quality mode (for example, a resolution of 368 pixels×368 pixels per frame) to predict a reception timing of the specific scene. The client terminal 100 switches an acquisition mode of the moving image data MD from the low image quality mode to a high image quality mode (for example, a resolution of 640 pixels×480 pixels per frame) in accordance with the predicted timing, and transmits a high quality frame image to the motion analysis server 200. The client terminal 100 transmits a frame image of a scene other than the specific scene to the motion analysis server 200 while maintaining a low image quality.

The feature of the specific scene to be extracted is defined in the motion analysis algorithm AL. The specific scene is detected based on contour information on the target TG, posture information LPI (refer to FIG. 5), a positional relationship between a specific object OB used by the target TG and the target TG, and the like. The specific object OB is, for example, a soccer ball in the case of soccer, and is a golf club and a golf ball in the case of golf.

For example, in a case where the determination item is soccer shooting, (i) a timing of stepping on the pivot foot, (ii) a timing at which the thigh of the kicking leg moves toward the ball, (iii) a timing of impact, and (iv) a timing after specified seconds after impact are defined as phases, which are targets to be analyzed, respectively. A phase determination condition is defined based on, for example, an angle of a specific joint and a relative position between a ball, which is the object OB, and a feature point (a key point) of a specific body.

The client terminal 100 extracts a plurality of specific scenes each including the phases (i) to (iv) from the moving image data MD. If only the specific scene is detected, the detection can be performed at high speed even using the low performance client terminal 100. Since only the frame image included in the specific scene is a target of the motion analysis, analysis costs by the motion analysis server 200 can be suppressed.

<<Flow of Preprocessing>>

Figure 5:
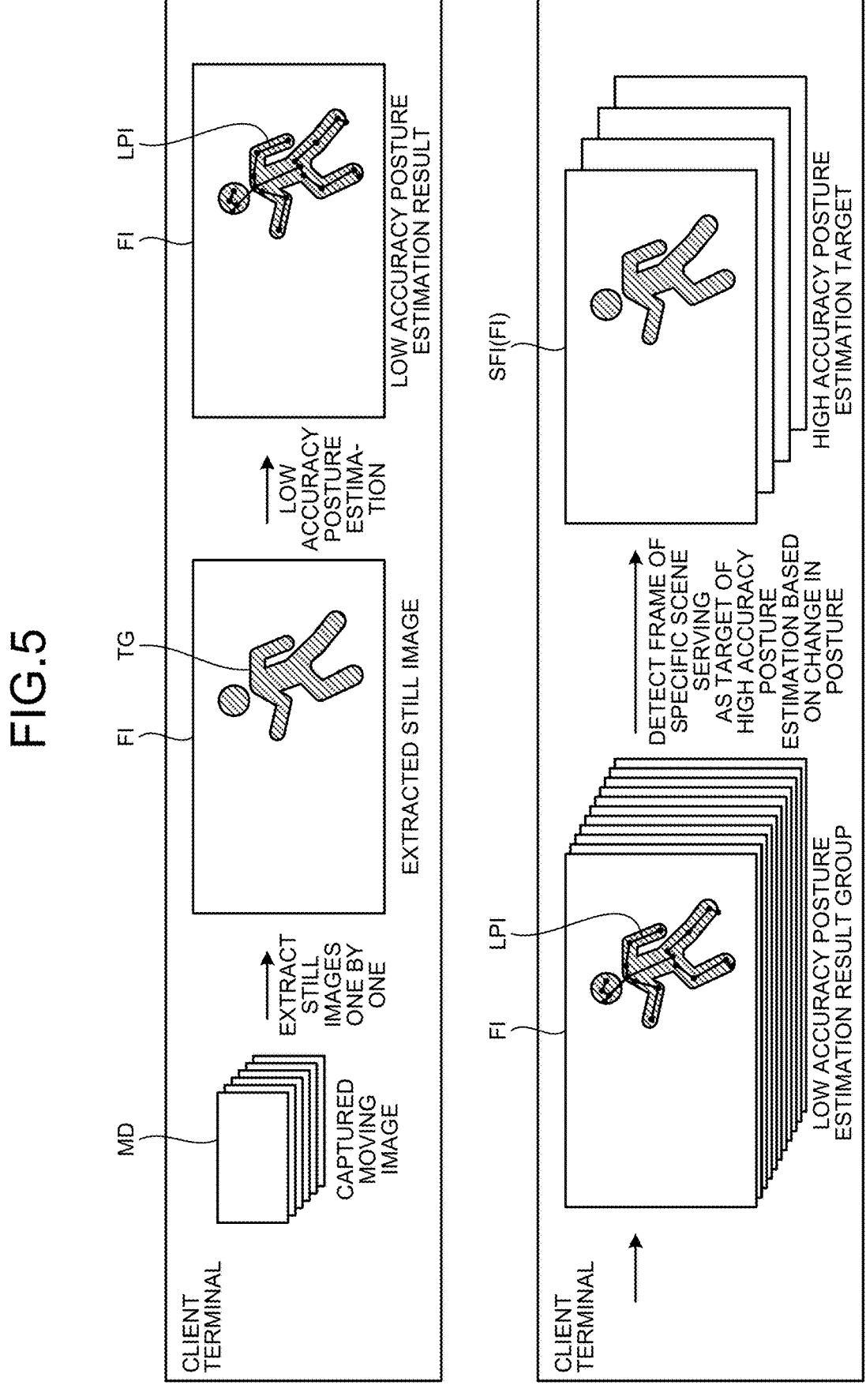
FIG. 5 is a diagram illustrating a specific example of preprocessing.
Figure 6:
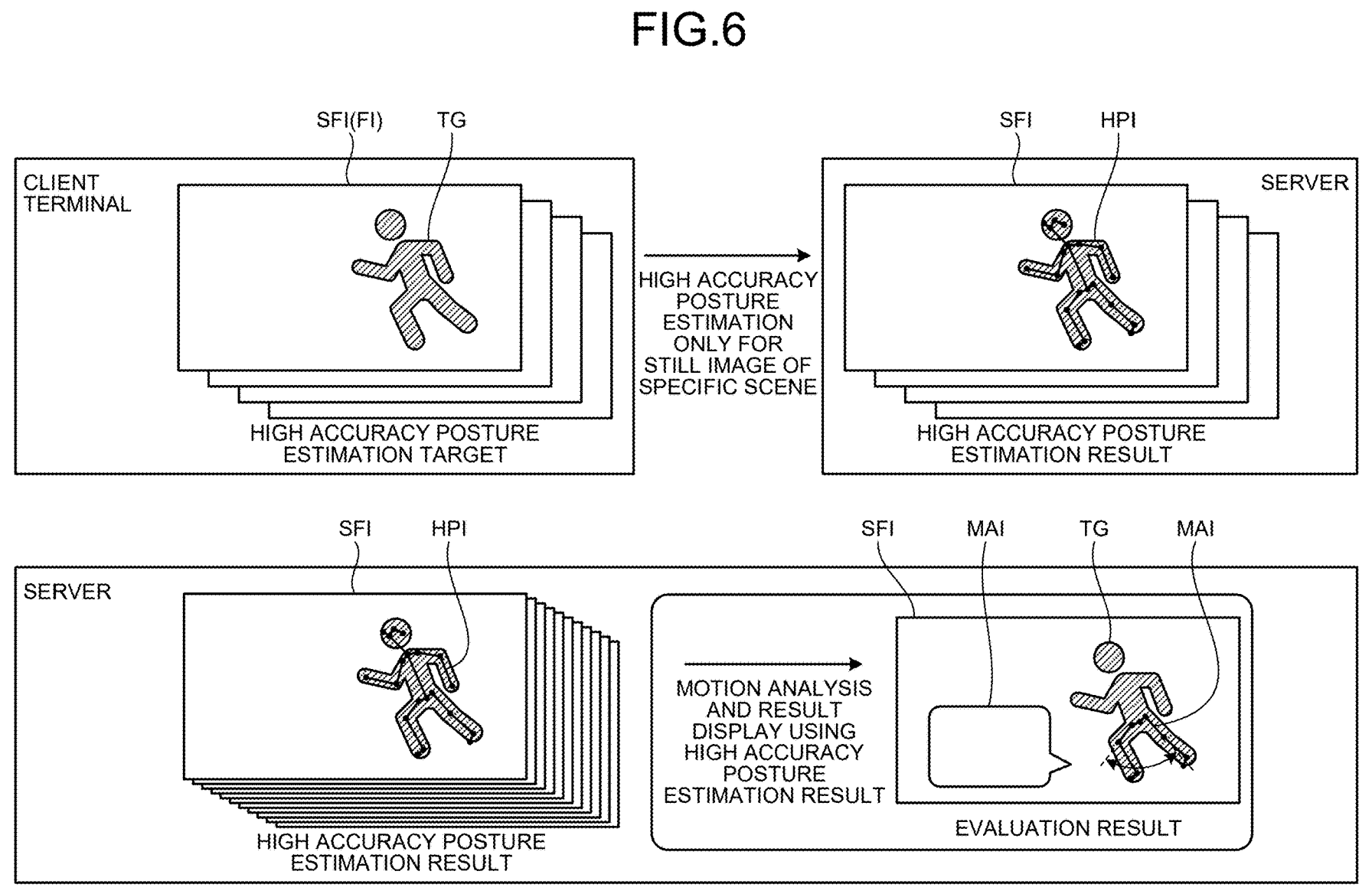
Figure 7:
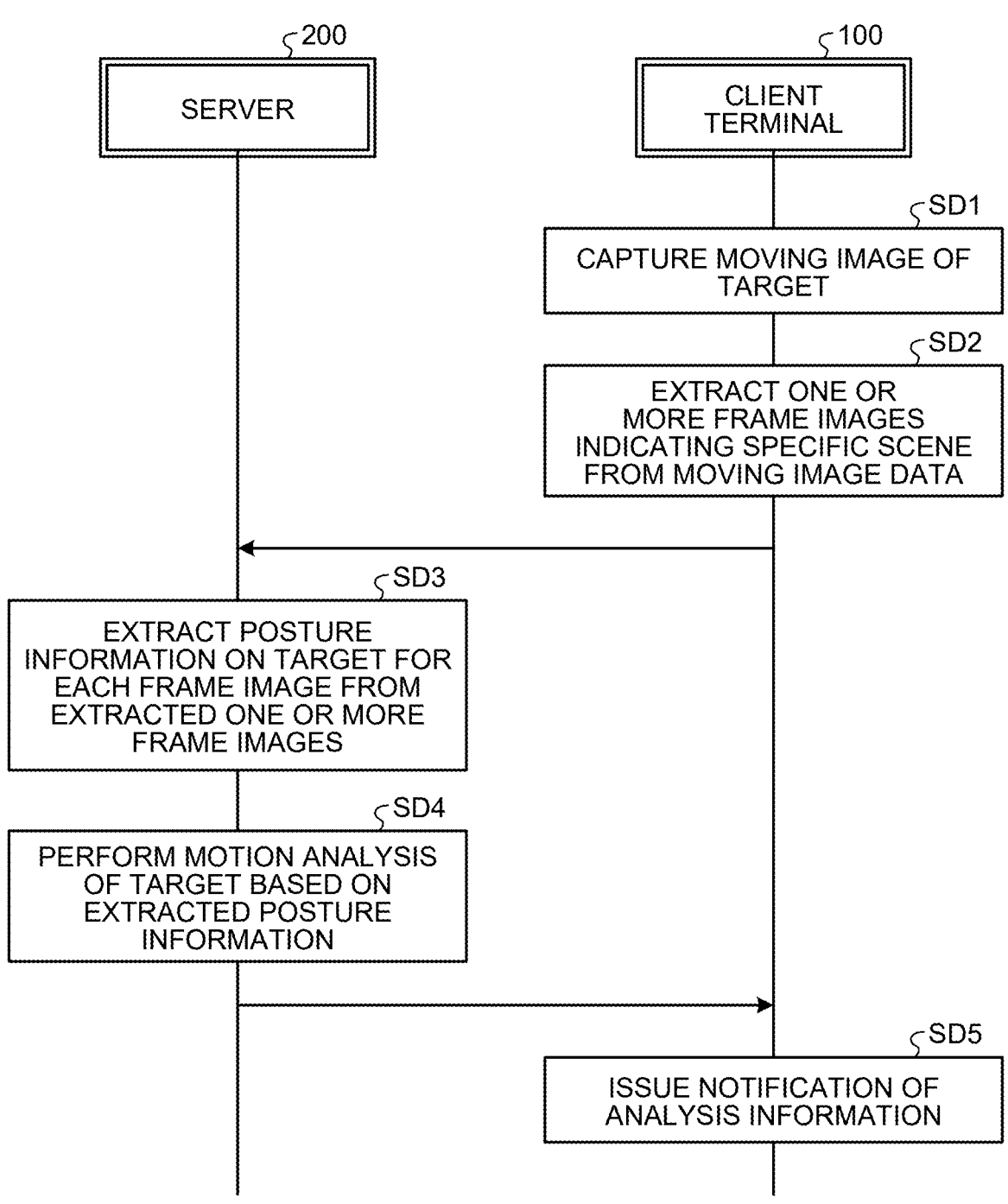
FIG. 7 is a diagram illustrating a specific example of the preprocessing.

FIGS. 5 to 7 are diagrams illustrating specific examples of preprocessing. Hereinafter, a flow of FIG. 7 will be described with reference to FIGS. 5 and 6.

The client terminal 100 captures a moving image of the target TG (Step SD1). The moving image data MD includes a plurality of frame images FI arranged in time series. The moving image includes a specific scene to be analyzed and scenes before and after the specific scene.

The client terminal 100 extracts one or more frame images FI (specific frame images SFI) indicating the specific scene from the moving image data MD (Step SD2). The determination of the specific scene is performed, for example, based on the motion of the target TG. The motion of the target TG is estimated, for example, based on the posture information LPI (information indicating a low accuracy posture estimation result by a first analysis model 143) of the target TG extracted from all frame images FI of the moving image data MD using the first analysis model 143 (refer to FIG. 9) having a low calculation amount with low accuracy.

As described above, the preprocessing of extracting the target of high accuracy posture estimation is completed. The extracted frame image is subjected to motion analysis by the motion analysis server 200.

For example, the motion analysis server 200 extracts the posture information HPI of the target TG for each frame image SFI from the extracted one or more specific frame images SFI (Step SD3). The posture information HPI of the target TG is extracted only from the one or more specific frame images SFI using, for example, a second analysis model 297 (refer to FIG. 9) having a high calculation amount with high accuracy.

The motion analysis server 200 extracts the posture information HPI indicating a motion timing of each phase from among the extracted one or more pieces of posture information HPI (information indicating a highly accurate posture estimation result by the second analysis model 297). As a result, a plurality of phases included in the series of motions are detected. The motion analysis server 200 analyzes the motion of the target TG for each phase using the posture information HPI indicating the motion timing of each phase (Step SD4).

The client terminal 100 receives the analysis information MAI from the motion analysis server 200 and notifies the target TG of the analysis information MAI (Step SD5).

It is noted that, in the examples of FIGS. 5 to 7, the low accuracy posture estimation is performed by the client terminal 100, and the high accuracy posture estimation is performed by the motion analysis server 200, but the sharing of posture estimation is not limited thereto. For example, all posture estimation (the low accuracy posture estimation and the high accuracy posture estimation) may be performed by the client terminal 100, or all posture estimation may be performed by the motion analysis server 200. In either case, an excellent effect of quick detection of a specific scene and reduction of a total of three strikes in the high accuracy posture estimation can be obtained.

3-3. Analysis/Evaluation Processing

Figure 8:
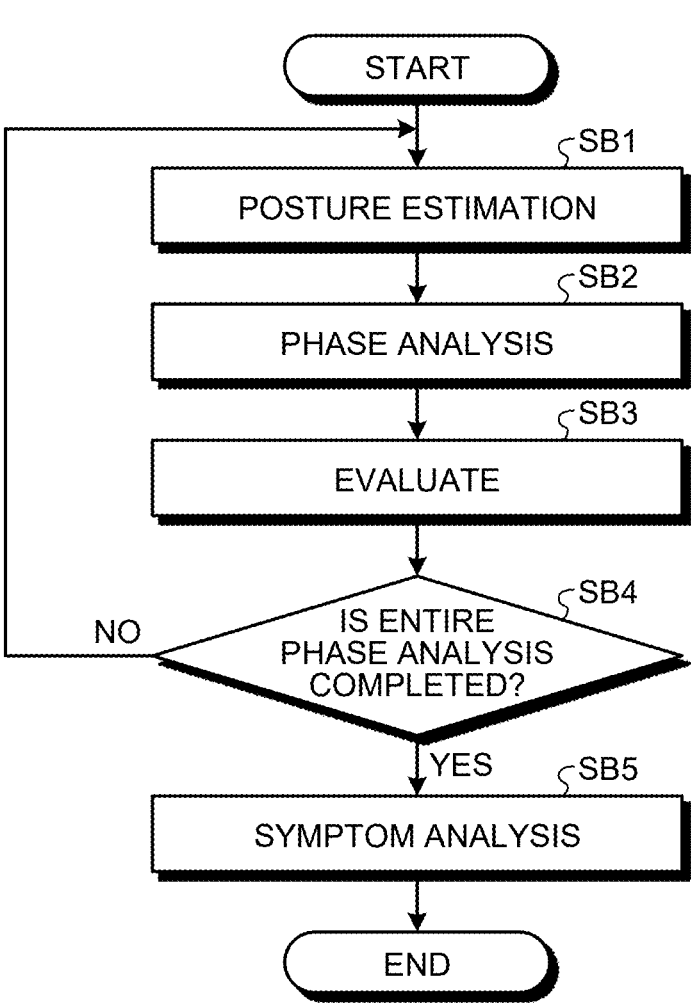
FIG. 8 is a flowchart illustrating an example of analysis/evaluation processing.

FIG. 8 is a flowchart illustrating an example of analysis/evaluation processing.

<Step SB1: Posture Estimation>

Video of a plurality of specific scenes are extracted from the moving image data MD and transmitted from the client terminal 100 to the motion analysis server 200. The motion analysis server 200 performs posture analysis of each specific scene. The posture analysis is performed using a known posture estimation technique. For example, the motion analysis server 200 extracts a plurality of key points KP (a plurality of feature points indicating a shoulder, an elbow, a wrist, a waist, a knee, an ankle, and the like: refer to FIG. 10) from the image of the target TG using a deep learning method. The motion analysis server 200 estimates the posture of the target TG based on a relative position between the extracted key points KP.

The motion analysis server 200 extracts the posture information HPI of the target TG from each frame image included in the specific scene. The posture information HPI means information indicating the position (coordinates) of each key point KP and a positional relationship (a joint angle or the like) between the key points KP. The motion analysis server 200 is an information processing device having higher performance than that of the client terminal 100. Therefore, the posture information HPI having higher accuracy than that of the posture analysis performed by the client terminal 100 is extracted. By using the highly accurate posture information HPI, the accuracy of the motion analysis is also enhanced.

<Step SB2: Phase Analysis>

In the motion analysis algorithm AL, definition information on how to define the posture of each phase is defined. The posture is defined based on, for example, a positional relationship between the key points KP (an angle, a distance, and the like) and a mode of movement of a specific key point KP (a state of a change in moving direction, moving speed, moving speed, and the like). The posture may be defined based on a positional relationship with a specific object OB (such as a ball) used by the target TG.

A plurality of postures may be defined in one phase. By setting the plurality of postures as targets to be analyzed, it is possible to analyze the transition of the postures occurring in the same phase. For example, in a golf swing, the transition of the posture during swing may be evaluated. Only by looking at a start time point and an end time point of the phase, it is not possible to know what kind of swing has been performed during that time. By analyzing one or more frame images SFI in the middle of the start time point and the end time point of the phase, it is possible to grasp the transition of the posture in the same phase. Accordingly, it is possible to check whether a correct motion has been performed.

The motion analysis server 200 extracts one or more frame images SFI defined in the definition information from one or more frame images SFI included in the specific scene. As a result, one or more postures associated with the same phase defined in the definition information are detected. As a method of determining the posture, a determination method based on a threshold value may be used, or a determination method based on machine learning such as deep learning may be used.

<Step SB3: Evaluation>
<<Classification of Items>>

In the motion analysis algorithm AL, one or more evaluation items are defined for each phase. An individual evaluation item and a scoring reference are set by a trainer, a coach, or the like. When a standard evaluation item and a standard scoring reference are known, known evaluation item and scoring reference may be used as they are. For example, Barthel index (BI) and functional independence measure (FIM) are generally used as a method of evaluating activities of daily living (ADL). By using the known evaluation item and scoring reference, the state of the target TG can be grasped better.

<<Scoring>>

The motion analysis server 200 extracts the posture information HPI from the frame image SFI indicating the motion of the phase. The motion analysis server 200 scores the extracted posture information HPI for each evaluation item. The scoring may be performed on the individual posture information HPI or may be performed on the average posture information HPI across a plurality of frames. As a scoring method, a scoring method based on a threshold value may be used, or a scoring method based on machine learning such as deep learning may be used. A scoring timing may be in real time or after the moving image is captured.

<Step SB5: Symptom Classification>

When the analysis of all the phases is completed (Step SB4: Yes), the motion analysis server 200 detects a feature of the motion of the target TG based on a scoring result of each phase. The motion analysis server 200 classifies the symptoms of the target TG based on the feature of the motion. As a classification method, a classification method based on a threshold value may be used, or a classification method based on machine learning such as deep learning may be used. In the motion analysis algorithm AL, for example, a plurality of classification items set by a trainer or a coach are defined.

<<Comparison>>

The motion analysis server 200 evaluates a series of motions of the target TG based on a scoring result of each evaluation item and a classification result of the symptom. The motion analysis server 200 can compare an evaluation result of the target TG with an evaluation result of another person (a model person, another sports member) or a past evaluation result of the target TG, and notify the target TG of a comparison result. Examples of a comparison method include a method of displaying a plurality of skeleton images to be compared in an overlay manner or in parallel. At this time, it is preferable to match the sizes of the skeleton images.

<<Report>>

The motion analysis server 200 generates the analysis information MAI indicating evaluation results of the series of motions, and reports the generated analysis information MAI to the target TG, the family FM, and the like. The analysis information MAI includes, for example, various types of information for supporting the target TG, such as a current situation of the target TG (a scoring result and a classification result of symptom), a symptom transition, a piece of advice, and a recommended training plan. A timing of the report can be freely and selectively set.

4. Functional Configuration Related to Analysis/Intervention Processing

Figure 9:
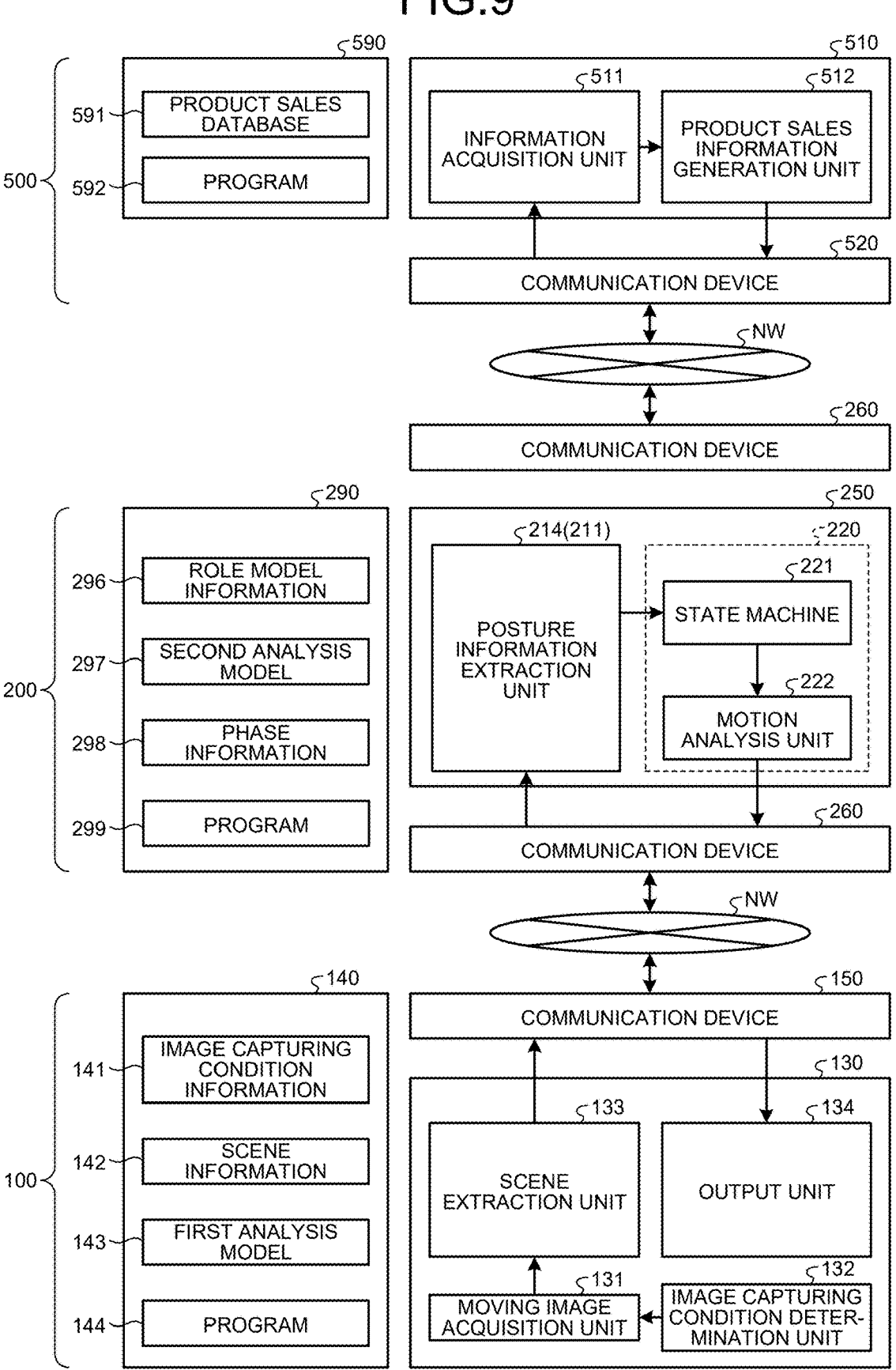
FIG. 9 is a diagram illustrating an example of a functional configuration related to analysis/intervention processing.

FIG. 9 is a diagram illustrating an example of a functional configuration related to analysis/intervention processing.

<Client Terminal>

The client terminal 100 includes a processing device 130, a storage device 140, and a communication device 150. The processing device 130 includes a moving image acquisition unit 131, an image capturing condition determination unit 132, a scene extraction unit 133, and an output unit 134.

The moving image acquisition unit 131 acquires the moving image data MD of the target TG captured by the camera 160. A moving image includes a plurality of specific scenes corresponding to respective phases.

The scene extraction unit 133 acquires the moving image data MD from the moving image acquisition unit 131. The scene extraction unit 133 extracts one or more frame images SFI indicating a specific scene for each phase from the moving image data MD. The number of extracted frame images SFI is, for example, one or more and ten or less. For example, the scene extraction unit 133 determines the specific scene based on the motion of the target TG. The scene extraction unit 133 determines the specific scene by collating the feature of the motion of the target TG with scene information 142.

For example, the scene extraction unit 133 detects switching to the specific scene based on a posture analysis result of a frame image group before the specific scene. The scene extraction unit 133 extracts one or more frame images FI having higher resolution than that of the frame image group acquired in response to the switching to the specific scene as one or more specific frame images SFI indicating the specific scene.

In the scene information 142, a plurality of specific scenes corresponding to the respective phases and a determination condition for determining each specific scene are defined in association with each other. The definition information on the specific scene and a determination method of the specific scene are defined in the motion algorithm AL. The client terminal 100 extracts the definition information on the specific scene and the determination method of the specific scene from the index database 295, and stores the extracted definition information and determination method in the storage device 140 as the scene information 142.

The scene extraction unit 133 extracts the posture information LPI of the target TG using, for example, a first analysis model 143 obtained by machine learning. The first analysis model 143 is, for example, an analysis model having lower estimation accuracy of the posture than that of the analysis model (the second analysis model 297) to be used when the posture information HPI is extracted by the motion analysis server 200. The scene extraction unit 133 detects the switching to the specific scene based on the change in the posture of the target TG estimated from the extracted posture information LPI.

The moving image data MD includes information on the series of motions including a plurality of specific scenes generated in time series. The scene extraction unit 133 determines which specific scene is generated from an individual viewpoint in consideration of the preceding and subsequent contexts in the flow of the motion. For example, in the motion of the shooting of the soccer, first, the specific scene corresponding to the phase of the (i) is determined, and then, the specific scenes corresponding to the respective phases are determined in the order of the (ii), the (iii), and the (iv) from the moving image data after the (i). Each specific scene is determined based on the body motion assumed for each specific scene.

In order to facilitate the determination, the scene extraction unit 133 detects the switching to the specific scene based on, for example, a motion of the target TG when the target TG and the specific object OB (such as a ball in the case of soccer) are in a predetermined positional relationship or a change in the positional relationship between the target TG and the specific object OB. In this configuration, the specific scene is determined with higher accuracy than a case in which the specific scene is determined based only on a relative positional relationship between the skeletons.

For example, the determination of the specific scene corresponding to the (i) is performed as follows. First, a unique area where the pivot foot is assumed to hardly move when stepping on the pivot foot is defined based on a relative positional relationship with a ball. The unique area is defined, for example, as an image area having a radius $A \times r$ (r is the radius of the ball. A is a number larger than 1) from the center of the ball.

For example, the scene extraction unit 133 extracts, as a reference frame image, a frame image in which a distance between the pivot foot and the ball is within a threshold value. The scene extraction unit 133 extracts N frame images FI up to the reference frame image from the frame image FI traced back by (N–1) frames from the reference frame image (N is an integer of 1 or more). The scene extraction unit 133 extracts a skeleton area in which the skeleton of the heel of the target TG fits for each of the N frame images FI. The scene extraction unit 133 extracts a skeleton motion area in which all the N skeleton areas are included. When the size of the skeleton motion area is within a threshold value and the skeleton motion area is included in the unique area, the scene extraction unit 133 determines that the pivot foot is stepped on. The scene extraction unit 133 extracts one or more frame images FI indicating the timing at which the pivot foot is stepped on from the moving image data MD.

When the frame image FI of the specific scene corresponding to the (i) is extracted, the scene extraction unit 133 proceeds to work of extracting the frame image FI of the specific scene corresponding to the (ii). For example, the scene extraction unit 133 determines a timing at which an extension line of the foot detected as the pivot foot passes through the ball as the specific scene corresponding to the (ii).

The determination of the specific scene corresponding to the (ii) is performed on the moving image data MD after the specific scene corresponding to the (i). Considering the preceding and subsequent contexts in the flow of the motion, it is considered that the specific scene corresponding to the (ii) occurs immediately after the specific scene corresponding to the (i). Therefore, if there is a scene in which the extension line of the foot detected as the pivot foot passes through the ball within a predetermined time immediately after the specific scene corresponding to the (i), there is a high possibility that the scene is the specific scene corresponding to the (ii). Therefore, the scene extraction unit 133 determines the scene as the specific scene corresponding to the (ii), and extracts one or more frame images FI indicating the specific scene from the moving image data MD.

When the frame image FI of the specific scene corresponding to the (ii) is extracted, the scene extraction unit 133 proceeds to work of extracting the frame image FI of the specific scene corresponding to the (iii). For example, after a distance between the center of the waist and the center of the ball decreases, the scene extraction unit 133 determines a timing at which the distance increases at a speed higher than a speed at which the distance decreases as the specific scene corresponding to the (iii).

When the ball is impacted, the distance between the center of the waist and the center of the ball tends to decrease until immediately before the impact, but when the ball is impacted, the distance starts to increase at a speed much higher than the speed at which the distance decreases. Using this, the scene extraction unit 133 calculates a distance between the center of the hipbone and the center of the ball in each frame image FI, and determines that the mode of change in the distance is reversed when a value obtained by dividing a difference in the distance between the frames with a diameter of the ball exceeds a threshold value. The scene extraction unit 133 determines that the scene immediately before the mode of the change in the distance is reversed is the specific scene corresponding to the (iii).

The determination of the specific scene corresponding to the (iii) is performed on the moving image data MD after the specific scene corresponding to the (ii). Considering the preceding and subsequent contexts in the flow of the motion, it is considered that the specific scene corresponding to the (iii) occurs immediately after the specific scene corresponding to the (ii). Therefore, in a case where the above-described change in distance occurs within a predetermined time immediately after the specific scene corresponding to the (ii), there is a high possibility that the scene is the specific scene corresponding to the (iii). Therefore, the scene extraction unit 133 determines the scene as the specific scene corresponding to the (iii), and extracts one or more frame images FI indicating the specific scene from the moving image data MD.

When the frame image FI of the specific scene corresponding to the (iii) is extracted, the scene extraction unit 133 proceeds to work of extracting the frame image FI of the specific scene corresponding to the (iv). The frame image FI of the specific scene corresponding to the (iv) is used to analyze the posture after shooting.

The specific scene corresponding to the (iv) is defined as a scene after a lapse of a predetermined time from the specific scene corresponding to the (iii). The time until a posture suitable for analysis is detected depends on rushing into the ball and the speed of motion. Then, although a timing that has elapsed to a certain extent since shooting is determined as the specific scene corresponding to the (iv), the timing varies depending on each target TG. Therefore, in consideration of individual differences, for example, the scene extraction unit 133 determines, as the specific scene corresponding to the (iv), a timing at which frame time of a predetermined number of times the number of frames from the specific scene corresponding to the (ii) to the specific scene corresponding to the (iii) has elapsed.

The estimation accuracy of the posture changes depending on the scale of a neural network used for an analysis model. When a large-scale neural network is used, a large number of key points KP are extracted from image data, and various motions of the target TG are estimated with high accuracy. Even if information is missing due to occlusion or the like, the key point KP of the target TG is extracted with high accuracy. As a method of increasing the scale of the neural network, there are a method of increasing a feature map (channel) and a method of deepening a layer (layer). In either method, a processing amount of the convolution operation increases, and as such a calculation speed deteriorates. There is a trade-off relationship between the estimation accuracy of the posture and the calculation speed.

The scene extraction unit 133 extracts the posture information LPI of the target TG from all the frame images FI constituting the moving image data MD using, for example, the first analysis model 143 having a small scale of the neural network and a low calculation amount with low accuracy. It is sufficient that the rough motion of the target TG can be grasped only for determining the specific scene of the target TG. Even if there is a lack of information due to occlusion or the like, the feature of the motion is grasped by a rough change in posture. Therefore, the motion scene of the target TG can be determined even using the first analysis model 143 having the low calculation amount with low accuracy. In a case where the first analysis model 143 is used, the processing amount of the convolution operation for each frame image FI is small, so that quick processing can be performed even if the moving image data MD is large.

Data of one or more frame images SFI indicating the specific scene is transmitted to the motion analysis server 200 via the communication device 150. The motion analysis server 200 performs motion analysis of a phase corresponding to the specific scene using the received one or more frame images SFI. The output unit 134 receives the evaluation result (the analysis information MAI) based on the motion analysis from the motion analysis server 200 via the communication device 150. The output unit 134 notifies the target TG of the received analysis information MAI. The notification is performed by, for example, a combination of a character, a chart, and a voice.

The image capturing condition determination unit 132 determines the image capturing direction of the target TG at the time of acquiring the moving image data MD based on the type (the determination item) of the motion serving as a target of the motion analysis. In the index database 295, one or more image capturing directions in which image capturing is to be performed are defined for each determination item. The image capturing direction is determined from a viewpoint of ease of grasping a point motion. For example, the image capturing direction is determined such as a front direction (a direction perpendicular to the frontal plane), a side direction (a direction perpendicular to the sagittal plane), or both the front direction and the side direction of the target TG based on the feature of the motion serving as a target to be analyzed. The image capturing condition determination unit 132 notifies the target TG of the image capturing direction defined in the index database 295.

It is noted that, in a case where three-dimensional coordinate information on the target TG can be acquired using a time of flight (ToF) sensor or the like, the posture information HPI of the target TG in the front direction and the side direction can be extracted from one piece of moving image data MD. In such a case, it is not necessary to separately capture videos in the front direction and the side direction.

The storage device 140 stores, for example, image capturing condition information 141, the scene information 142, the first analysis model 143, and a program 144. The image capturing condition information 141 includes information on an image capturing condition defined in the motion analysis algorithm AL. The client terminal 100 extracts information on the image capturing condition from the index database 295, and stores the extracted information in the storage device 140 as the image capturing condition information 141. It is noted that image capturing condition information 141 and the scene information 142 may be downloaded from the index database 295 or may be installed in the client terminal 100 from the beginning.

The program 144 is a program that causes a computer to execute information processing of the client terminal 100. The processing device 130 performs various types of processing in accordance with the program 144. The storage device 140 may be used as a work area for temporarily storing a processing result of the processing device 130. The storage device 140 includes any non-transitory storage medium, such as a semiconductor storage medium and a magnetic storage medium. The storage device 140 includes, for example, an optical disk, a magneto-optical disk, or a flash memory. The program 144 is stored in, for example, a non-transitory computer-readable storage medium.

The processing device 130 is, for example, a computer including a processor and a memory. The memory of the processing device 130 includes a random access memory (RAM) and a read only memory (ROM). The processing device 130 functions as the moving image acquisition unit 131, the image capturing condition determination unit 132, the scene extraction unit 133, and the output unit 134 by executing the program 144.

<Motion Analysis Server>

The motion analysis server 200 includes a processing device 250, a storage device 290, and a communication device 260. The processing device 250 includes a posture information extraction unit 214, a state machine 221, and a motion analysis unit 222. The posture information extraction unit 214 is included in the sensor data analysis unit 211. The state machine 221 and the motion analysis unit 222 are included in the evaluation unit 220.

The posture information extraction unit 214 acquires one or more frame images SFI indicating the specific scene transmitted from the client terminal 100 via the communication device 260. Using the second analysis model 297 obtained by machine learning, the posture information extraction unit 214 extracts the posture information HPI of the target TG for each frame image SFI from the one or more frame images SFI indicating the specific scene.

The second analysis model 297 is an analysis model having higher estimation accuracy of the posture than that of the analysis model (the first analysis model 143) used when the scene extraction unit 133 determines the specific scene. For example, the posture information extraction unit 214 extracts the posture information HPI of the target TG from the one or more specific frame images SFI using the second analysis model 297 having a large scale of the neural network and a high calculation amount with high accuracy. The target of the posture estimation processing by the posture information extraction unit 214 is only one or more specific frame images SFI selected from the plurality of frame images FI forming the moving image data MD. Therefore, even if the processing amount of the convolution operation for each frame image SFI is large, it is possible to perform quick processing.

The state machine 221 detects a plurality of phases included in the series of motions of the target TG based on the posture information HPI of the target TG. For example, the state machine 221 collates the feature included in the posture information HPI of the target TG with phase information 298. In the phase information 298, a plurality of phases to be analyzed and a determination condition for determining each phase are defined in association with each other. Phase definition information and a phase determination method (a phase boundary detection method) are defined in the motion algorithm AL. In FIG. 9, various types of information regarding the phase (the definition information for each phase, the determination method, and the like) defined in the motion algorithm AL are illustrated as the phase information 298.

The state machine 221 extracts one or more pieces of posture information HPI according to a collation result from one or more pieces of posture information HPI extracted by the posture information extraction unit 214. The one or more pieces of posture information HPI extracted based on the collation result indicate the posture of the target TG in the phase defined in the phase information 298, respectively. Through this processing, a plurality of phases included in the series of motions are detected.

In a case where the motion of the target TG is captured from a plurality of directions, the state machine 221 detects a plurality of phases included in the series of motions based on the posture information HPI acquired from the plurality of directions. As a result, the plurality of phases are detected while compensating for information that is a blind spot.

The motion analysis unit 222 acquires the posture information HPI (posture information extracted for each frame image SFI from one or more frame images SFI included in the specific scene) of the target TG in the specific scene extracted by the posture information extraction unit 214. The motion analysis unit 222 extracts, as a target to be analyzed, one or more frame images SFI indicating a phase detected by the state machine 221 from one or more frame images SFI included in the specific scene.

The motion analysis unit 222 extracts, for each phase, one or more frame images SFI, each of which is a target to be analyzed, based on the detection result of the phase acquired from the state machine 221. The motion analysis unit 222 analyzes, for each phase, the posture information HPI serving as a target to be analyzed, and generates the analysis information MAI indicating evaluation results of a series of motions. The method of motion analysis (definition of a scoring item, a scoring method, and the like) is defined in the motion analysis algorithm AL. The motion analysis unit 222 performs the motion analysis based on the motion analysis algorithm AL acquired from the index database 295.

For example, the motion analysis unit 222 scores the motion of each phase based on one or more scoring items set for each phase, and generates the analysis information MAI based on the scoring result of each phase. The motion analysis unit 222 transmits the analysis information MAI to the client terminal 100, the trainer terminal 300, the family terminal 400, and the service provider server 500 via the communication device 260.

The storage device 290 stores role model information 296, the second analysis model 297, the phase information 298, and a program 299. The program 299 is a program that causes a computer to execute information processing of the motion analysis server 200. The processing device 250 performs various types of processing in accordance with the program 299 stored in the storage device 290. The storage device 290 may be used as a work area for temporarily storing a processing result of the processing device 250. The storage device 290 includes any non-transitory storage medium, such as a semiconductor storage medium and a magnetic storage medium. The storage device 290 includes, for example, an optical disk, a magneto-optical disk, or a flash memory. The program 299 is stored in, for example, a non-transitory computer-readable storage medium.

The processing device 250 is, for example, a computer including a processor and a memory. The memory of the processing device 250 includes a RAM and a ROM. The processing device 250 functions as the sensor data analysis unit 211, the evaluation unit 220, the posture information extraction unit 214, the state machine 221, and the motion analysis unit 222 by executing the program 299.

<Service Provider Server>

The service provider server 500 includes a processing device 510, a storage device 590, and a communication device 520. The processing device 510 includes an information acquisition unit 511 and a product sales information generation unit 512. The information acquisition unit 511 acquires the analysis information MAI via the communication device 520. Based on the analysis information MAI acquired from the information acquisition unit 511, the product sales information generation unit 512 extracts information on a product group suitable for the situation of the exercise of the target TG from the product sales database 591. The product sales information generation unit 512 generates product sales information based on the extracted information on the product group, and transmits the product sales information to the motion analysis server 200 via the communication device 520. The motion analysis server 200 generates the intervention information VI using the analysis information MAI, the product sales information, and the like, and transmits the intervention information VI to the client terminal 100.

The storage device 590 stores the product sales database 591 and a program 592. The program 592 is a program that causes a computer to execute information processing of the processing device 510. The processing device 510 functions as the information acquisition unit 511 and the product sales information generation unit 512 by executing the program 592. The configurations of the storage device 590 and the processing device 510 are similar to those of the storage device 290 and the processing device 250 of the motion analysis server 200.

5. Specific Example of Motion Analysis

Figure 10:
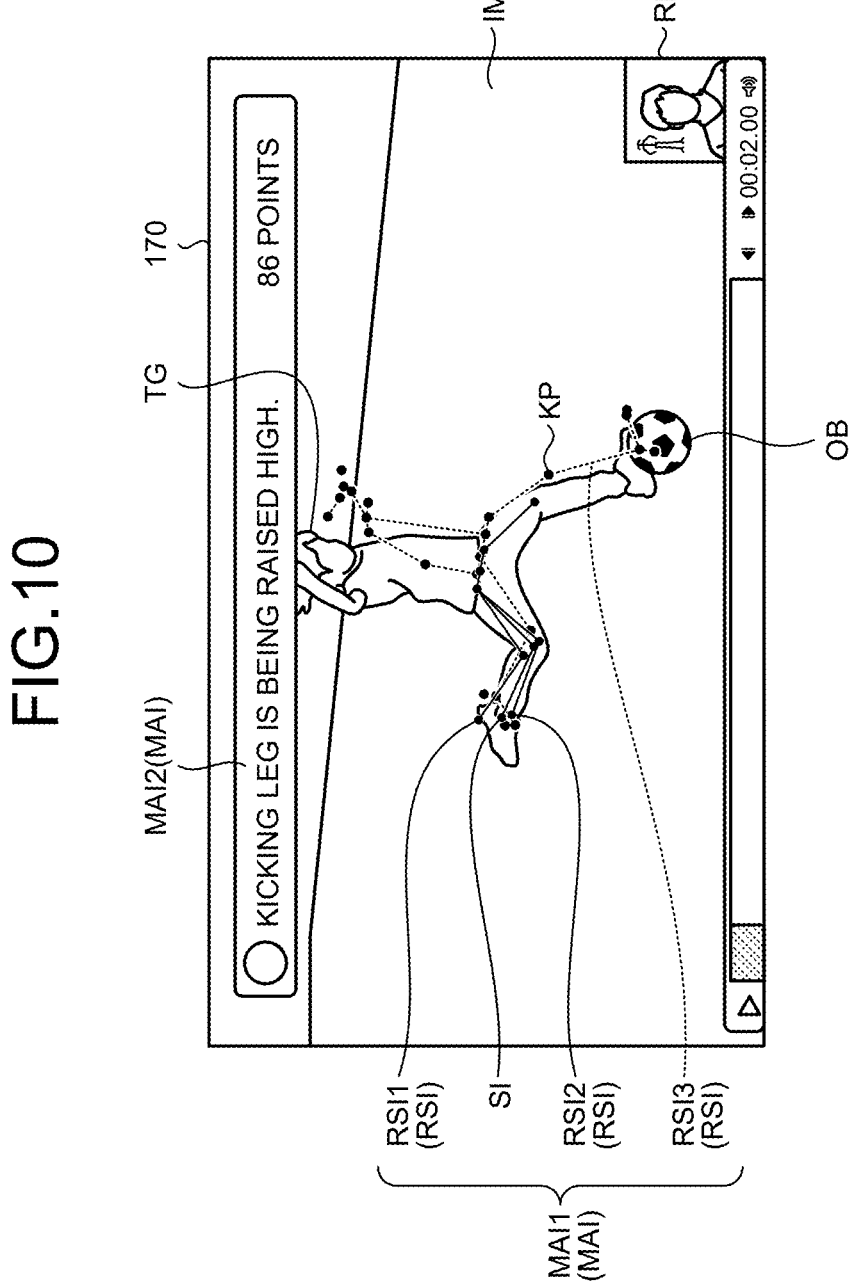
FIG. 10 is a diagram illustrating an example of analysis information.

FIG. 10 is a diagram illustrating an example of the analysis information MAI.

The motion analysis unit 222 generates the analysis information MAI based on the analysis result for each phase. The output unit 134 displays the analysis information MAI on the display device 170 together with the video of the moving image data MD serving as a target to be analyzed. For example, the output unit 134 temporarily stops the movement of the target TG for each phase, and displays the analysis information MAI together with a still image IM of the target TG in the phase.

For example, the output unit 134 issues a notification of first analysis information MAI1 and second analysis information MAI2 as the analysis information MAI. The first analysis information MAI1 includes, for each phase, information indicating comparison between the motion of the target TG and the motion of a specific person RM (for example, a professional player) as a model of the motion. The second analysis information MAI2 includes information indicating a guideline for bringing the motion of the target TG closer to the target motion of the specific person RM. In the example of FIG. 10, a comment of "kicking leg is being raised high" and an evaluation point of "86 points" are illustrated as the second analysis information MAI2. The evaluation point indicates a degree of achievement based on a preset reference.

Information on the motion of the specific person RM is stored in the storage device 290 as the role model information 296. In the motion analysis algorithm AL, information on a motion to be compared in performing the motion analysis is defined. In FIG. 9, information on a comparison target (information on the motion of the specific person RM, and the like) defined in the motion algorithm AL is illustrated as the role model information 296. The analysis information MAI may include information indicating a transition of a scoring result of each phase for each scoring item from the past to the present.

The first analysis information MAI1 includes, for example, skeleton information SI of the target TG and reference skeleton information RSI (skeleton information on the specific person RM) serving as a reference of comparison in each phase. The reference skeleton information RSI is generated using, for example, skeleton information obtained by correcting the skeleton information on the specific person RM in each phase based on a physical difference between the target TG and the specific person RM. The reference skeleton information RSI in each phase is included in the role model information 296.

For example, the scale of the reference skeleton information RSI is set as follows. First, one or more bones suitable for comparing the physiques of the specific person RM and the target TG are defined. For example, in the example of FIG. 10, the spine and the foot bones are defined as references for comparison. For each of the specific person RM and the target TG, the motion analysis unit 222 detects the lengths of the spine and the foot bones at the timing when the posture is aligned. The motion analysis unit 222 calculates a ratio of the sum of the lengths of the spine and the foot bones as a ratio of the body sizes of the specific person RM and the target TG, and changes the scale of the skeleton of the specific person RM based on the ratio. This facilitates comparison with the specific person RM, thereby making it easy to understand how the target TG should motion.

In the example of FIG. 10, a phase corresponding to a timing of stepping on the pivot foot is illustrated. As the reference skeleton information RSI, for example, first reference skeleton information RSI1, second reference skeleton information RSI2, and third reference skeleton information RSI3 are displayed.

The first reference skeleton information RSI1 is skeleton information on the motion of the specific person RM serving as a model. The second reference skeleton information RSI2 is skeleton information on a motion at a specific level (for example, the level of 80 points when a model is 100 points) that does not satisfy the model. The first reference skeleton information RSI1 and the second reference skeleton information RSI3 are skeleton information on the model at a timing when the position of the waist matches the target TG. The third reference skeleton information RSI3 is skeleton information on the model at a timing when the position of the pivot foot matches the target TG.

For example, the third reference skeleton information RSI3 is always displayed in conjunction with the movement of the target TG together with the skeleton information SI of the target TG during a series of motions from stepping on the pivot foot to immediately after impact. The third reference skeleton information RSI3 is used to compare the series of motions from stepping on the pivot foot to immediately after impact with the target TG. Therefore, the third reference skeleton information RSI3 indicates the skeleton information on the whole body unlike the first reference skeleton information RSI1 and the second reference skeleton information RSI2.

The time required for a series of motions is different between the specific person RM and the target TG. Therefore, a timing (for example, a timing of impact, a timing of stepping on the pivot foot, or the like) effective to perform the comparison is defined, and the third reference skeleton information RSI3 is superimposed on the target TG such that the defined timings match each other. In the example of FIG. 10, the timings of stepping on the pivot foot match each other, but which timing should be matched is appropriately set according to the purpose of a lesson or the like.

For example, the output unit 134 displays the position of the third reference skeleton information RSI3 in an offset manner such that the position of the ankle of the target TG and the position of the ankle of the specific person RM match each other at a defined timing. As a result, it is easy to understand a difference between the stepping positions of the target TG and the specific person RM.

The output unit 134 selectively displays information on the skeleton corresponding to a portion of the target TG to be analyzed in the phase as the skeleton information SI of the target TG, the first reference skeleton information RSI1, and second reference skeleton information RSI2. In the example of FIG. 10, the skeleton information on the waist and the leg is selectively displayed as the skeleton information SI, the first reference skeleton information RSI1, and the second reference skeleton information RSI2.

The first reference skeleton information RSI1 and the second reference skeleton information RSI2 may be always displayed in conjunction with the movement of the target TG during a series of motions. However, in order to clarify the comparison with the specific person RM, the first reference skeleton information RSI1 and the second reference skeleton information RSI2 can be displayed at a timing when a deviation from the motion of the specific person RM occurs. For example, the output unit 134 displays the skeleton information SI of the target TG, the first reference skeleton information RSI1, and the second reference skeleton information RSI2 at a timing when a difference exceeding an allowable reference is generated between the skeleton information SI of the target TG and the first reference skeleton information RSI1. The output unit 134 highlights and displays a portion of the skeleton of the target TG, in which portion is a portion at which the skeleton information SI of the target TG and the first reference skeleton information RSI1 are different from each other beyond the allowable reference.

The time required for a series of motions is different between the specific person RM and the target TG. Therefore, a timing effective for performing the comparison is defined as a phase, and the first reference skeleton information RSI1 is superimposed on the target TG such that the defined phases are matched. This facilitates comparison with the specific person RM, thereby making it easy to understand how the target TG should motion.

<Notification Example 1 of Analysis Information>

Figure 11:
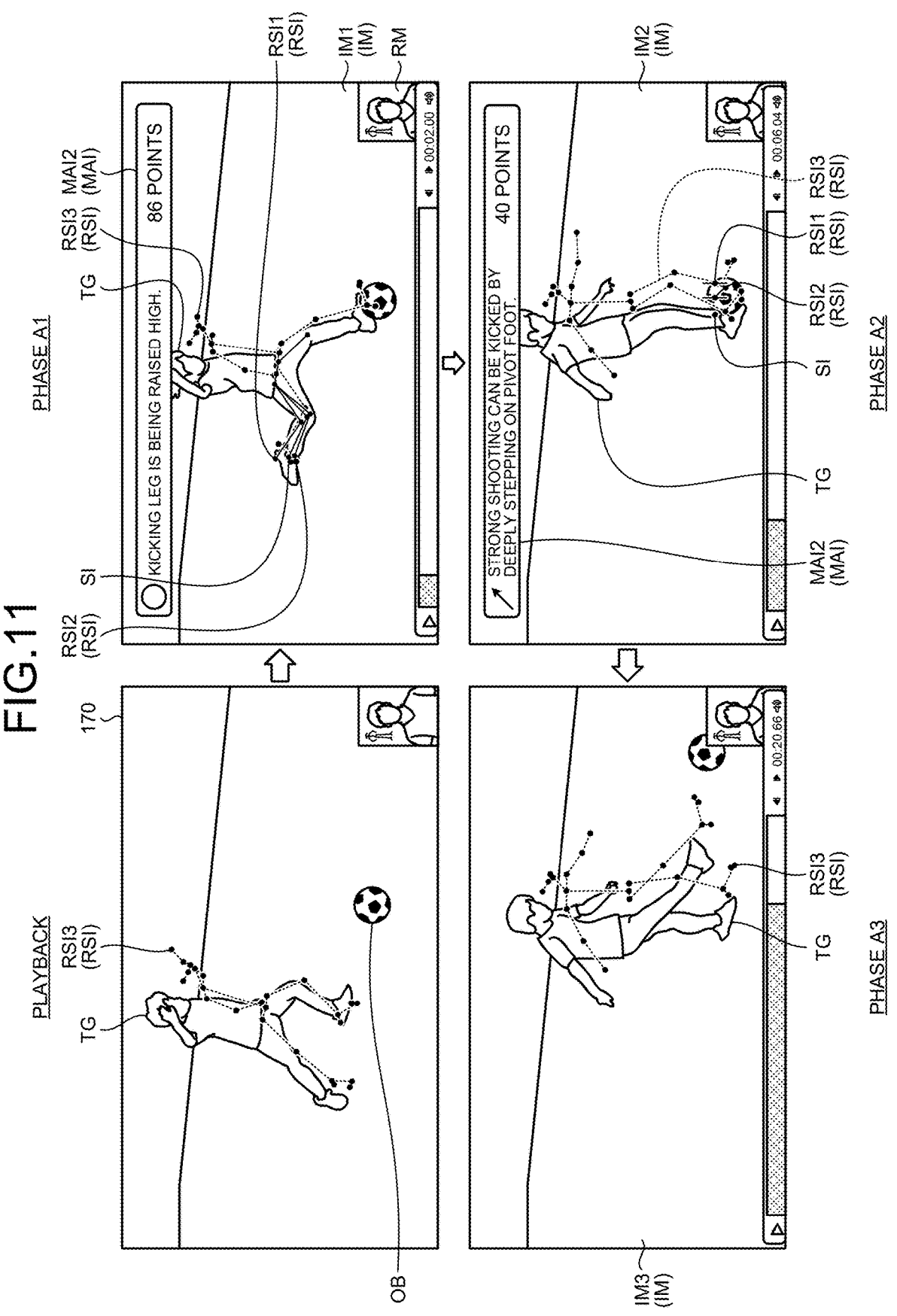
FIG. 11 is a diagram illustrating an example of a notification mode of the analysis information.

FIG. 11 is a diagram illustrating an example of a notification mode of the analysis information MAI.

The analysis information MAI is superimposed and displayed on a frame image indicating the motion timing of each phase. The display device 170 temporarily stops the playback of analysis moving image data AMD at the motion timing of each phase. Then, the display device 170 displays the still image IM in which the analysis information MAI is superimposed on the frame image of each phase. In a case where a plurality of phases are set, the playback of the analysis moving image data AMD is temporarily stopped for each phase, and a notification of the analysis information MAI of the corresponding phase is issued. It is noted that the playback of the moving image data MD may be performed in slow motion so that the posture of the target TG can be easily checked. At this time, slow motion playback may be applied only to a section from the first phase to the last phase, and videos before and after the section may be played back at a normal playback speed.

FIG. 11 illustrates an example in which three phases A1 to A3 are set. The phase A1 is a timing of stepping on the pivot foot. The phase A2 is an impact timing. The phase A3 is a timing immediately after the impact (after a specified several seconds from the impact).

First, the display device 170 plays back the moving image of the target TG based on a playback operation on the client terminal 100. The display device 170 temporarily stops the playback of the moving image data MD at a timing when the phase A1 is played back. Then, the display device 170 displays the still image IM (a first still image IM1) in which the analysis information MAI of the motion of the target TG in the phase A1 is superimposed on the frame image FI of the phase A1. Thereafter, the display device 170 starts the playback of the moving image after the phase A1 with the playback operation on the client terminal 100 or the lapse of a preset time from the start of display of the first still image IM1 as a trigger.

The display device 170 temporarily stops the playback of the moving image data MD at a timing when the phase A2 is played back. Then, the display device 170 displays the still image IM (a second still image IM2) in which the analysis information MAI of the motion of the target TG in the phase A2 is superimposed on the frame image FI of the phase A2. Thereafter, the display device 170 starts the playback of the moving image after the phase A2 with the playback operation on the client terminal 100 or the lapse of a preset time from the start of display of the second still image IM2 as a trigger.

The display device 170 temporarily stops the playback of the moving image data MD at a timing when the phase A3 is played back. Then, the display device 170 displays the still image IM (a third still image IM3) in which the analysis information MAI of the motion of the target TG in the phase A3 is superimposed on the frame image FI of the phase A3. Thereafter, the display device 170 starts the playback of the moving image after the phase A3 with the playback operation on the client terminal 100 or the lapse of a preset time from the start of display of the third still image IM3 as a trigger.

As a result, the display device 170 can temporarily stop the movement of the target TG in each phase and display the analysis information MAI in each phase together with the still image IM of the target TG in each phase. When a notification of the analysis information MAI of all the phases is issued, the display device 170 plays back the remaining moving image to the end.

<Notification Example 2 of Analysis Information>

Figure 12:
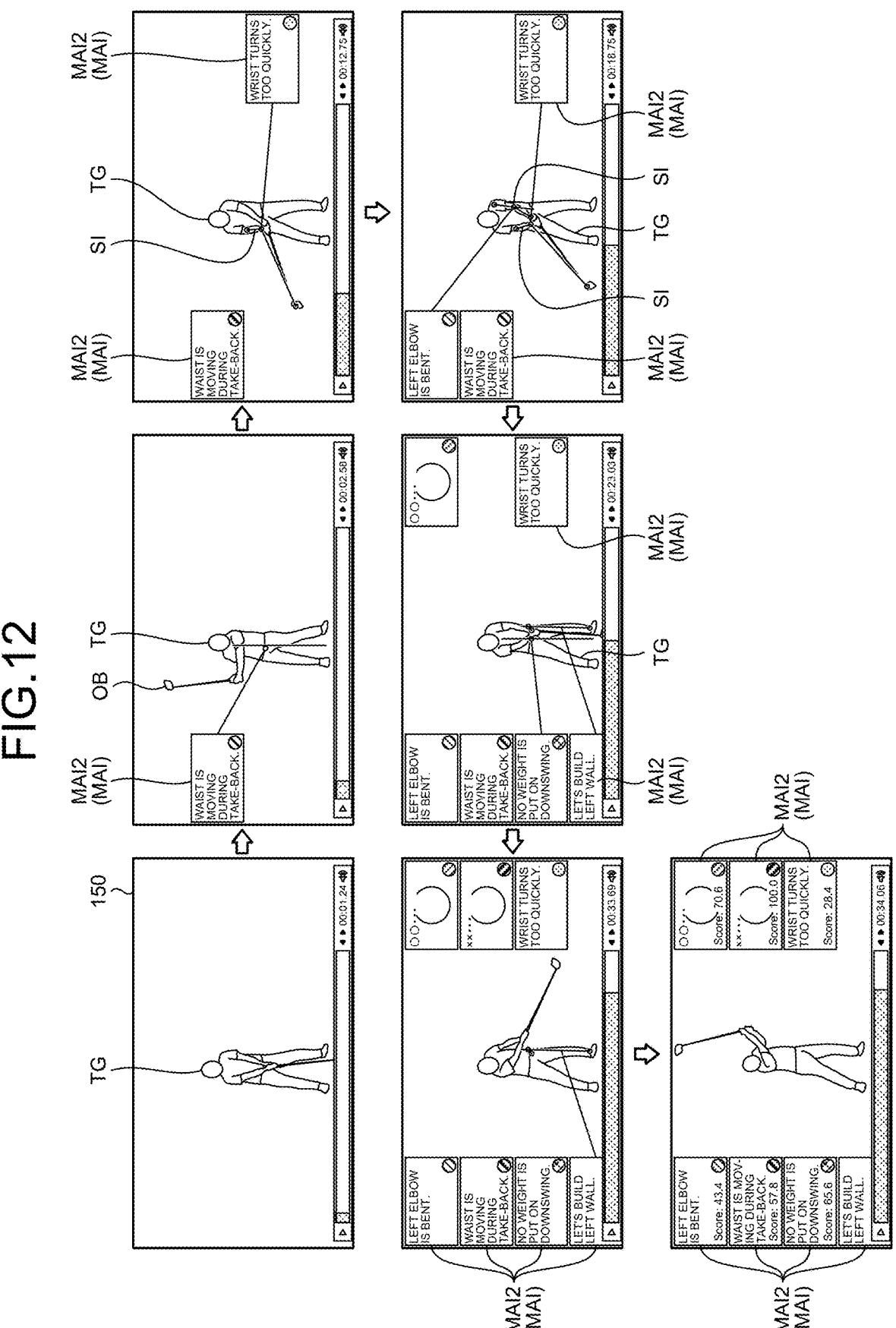
FIG. 12 is a diagram illustrating another example of the notification mode of the analysis information.

FIG. 12 is a diagram illustrating another example of the notification mode of the analysis information MAI. FIG. 12 illustrates an example in which a motion analysis service is applied to golf learning support.

FIG. 12 illustrates an example in which six phases are set. For example, a timing of backswing, a timing of downswing, a timing immediately before an impact, a timing of the impact, a timing immediately after the impact, and a timing of a follow-through are set as phases respectively serving as targets to be analyzed.

Similarly to the example described above, the moving image data MD is temporarily stopped at the timing when the motion of each phase is played back, and the analysis information MAI is superimposed and displayed. In the example of FIG. 12, the analysis information MAI of the past phase is continuously displayed on the display device 170 as it is without being erased. In addition, the reference skeleton information RSI serving as a model is not displayed. At the time of playback of the last phase or when a notification of the analysis information MAI of all phases is issued and the remaining moving image is played back to the end, evaluation points (scores) for the respective phases are collectively displayed.

In the example of FIG. 12, even after a notification of the analysis information MAI of a certain phase is issued, the analysis information MAI of the phase is not erased and continues to be displayed on the screen. However, the display mode of the analysis information MAI is not limited thereto. After the notification of the analysis information MAI of a certain phase is issued, the analysis information MAI may be once erased until the next phase is displayed, and when the last phase is played back, or when a notification of all the pieces of the analysis information MAI of all the phases are issued and the remaining moving image is played back to the end, all the pieces of the analysis information MAI of all the phases may be collectively displayed again.

<Modification>

In the example of FIG. 11, the first analysis information MAIL is presented as information indicating comparison with another person. However, the first analysis information MAI1 may include information indicating comparison with the past motion of the target TG. For example, the first analysis information MAI1 can include the current skeleton information SI on the target TG and the past skeleton information SI on the target TG serving as a reference for comparison.

For example, the output unit 134 displays the current skeleton information SI of the target TG and the past skeleton information SI of the target TG at a timing when a difference exceeding an allowable reference is generated between the current skeleton information SI of the target TG and the reference skeleton information RSI indicating the motion of the specific person RM. The output unit 134 highlights and displays a portion of the skeleton of the target TG, in which the portion is a portion at which the current skeleton information SI of the target TG and the reference skeleton information RSI are different from each other beyond the allowable reference.

In the above-described example, a description has been given as to an example in which the output unit 134 superimposes and displays the analysis information MAI on the playback screen of the moving image data MD. However, a method of issuing a notification of the analysis information MAI is not limited thereto. For example, the client terminal 100 may generate new moving image data (corrected moving image data) incorporating the analysis information MAI, and play back the generated corrected moving image data on the display device 170. For example, the analysis information MAI is written in the frame image indicating each phase of the corrected moving image data. In the corrected moving image data, after the movement of the target TG is stopped for each phase and the still image IM of the target TG including the analysis information MAI is displayed for a predetermined time, the display is adjusted so that the subsequent video is resumed toward the next phase.

The corrected moving image data may be generated by the motion analysis unit 222. The motion analysis unit 222 can transmit the generated corrected moving image data to the client terminal 100, the trainer terminal 300, the family terminal 400, and the service provider server 500 together with the analysis information MAI or instead of the analysis information MAI.

6. Variations Of System Configuration

Figure 13:
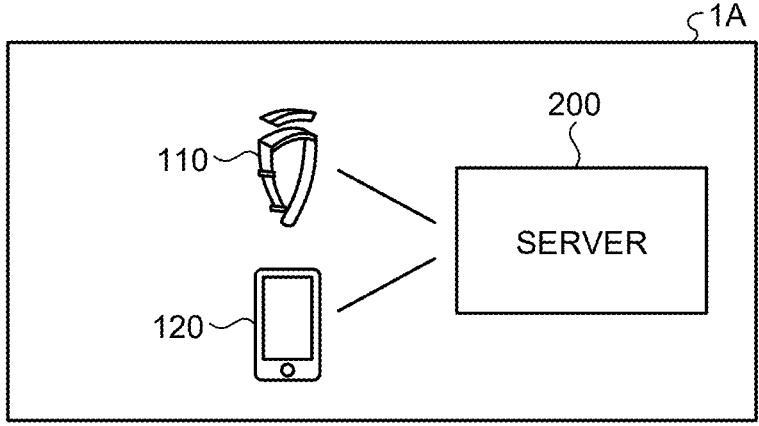
FIG. 13 is a diagram illustrating a variation of a system configuration.
Figure 13:
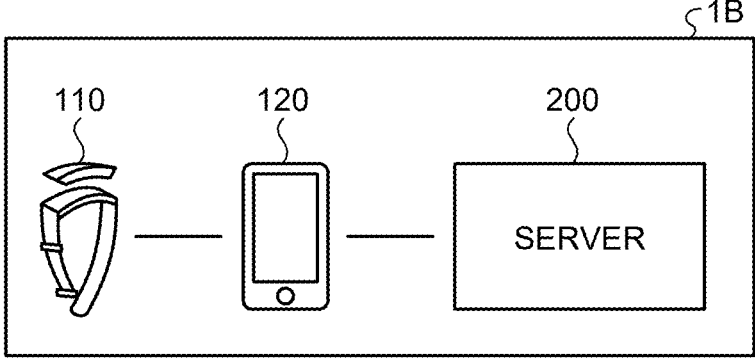

FIG. 13 is a diagram illustrating a variation of a system configuration.

An information processing system 1A on the upper side of FIG. 13 has a configuration in which the sensor unit 110 is built in the client terminal 100, similarly to the configuration in FIG. 2. In an information processing system 1B on the lower side of FIG. 16, the sensor unit 110 is provided as a device independent of the client terminal 100. Sensor data detected by the sensor unit 110 is temporarily stored in the client terminal 100 and then transmitted to the motion analysis server 200.

It is noted that, in the above-described example, an example in which a device owned by a service provider is a server (the service provider server 500) has been described. However, the device owned by the service provider does not necessarily need to be the server, and may be an information terminal such as a smartphone, a tablet terminal, a notebook computer, and a desktop computer.

7. Effects

The information processing system 1 includes the state machine 221 and the motion analysis unit 222. The state machine 221 detects a plurality of phases included in a series of motions of the target TG based on the posture information HPI of the target TG extracted from the moving image data CD. The motion analysis unit 222 analyzes the motion of the target TG for each phase using the posture information HPI. In the information processing method of the present disclosure, the processing of the information processing system 1 is executed by a computer. The program of the present disclosure causes a computer to implement the processing of the information processing system 1.

According to this configuration, the series of motions of the target TG is analyzed for each phase serving as a point. Therefore, the series of motions is accurately evaluated overall.

The information processing system 1 includes the scene extraction unit 133 and the posture information extraction unit 214. The scene extraction unit 133 extracts one or more specific frame images SFI indicating a specific scene corresponding to a phase for each phase from the moving image data MD. The posture information extraction unit 214 extracts the posture information HPI of the target TG from the extracted one or more specific frame images SFI.

According to this configuration, the posture information HPI is extracted only from the frame image FI (the specific frame image SFI) of the specific scene that needs to be analyzed. In a case where the moving image of the target TG is captured, in many cases, the motion including motions before and after the specific scene is captured such that the specific scene is reliably included in the moving image data MD. The moving image data MD before and after the specific scene does not contribute to the motion analysis. By omitting image processing of a data area that does not contribute to the motion analysis, the time and cost required for the motion analysis are reduced.

The scene extraction unit 133 detects switching to the specific scene based on a posture analysis result of a frame image group before the specific scene. The scene extraction unit 133 extracts, as one or more specific frame images SFI, one or more frame images FI having a resolution higher than that of the frame image group acquired in response to the switching to the specific scene.

According to this configuration, a reception timing of the specific scene is predicted based on the moving image data MD acquired in the low image quality mode. The acquisition mode of the moving image data MD is switched from the low image quality mode to the high image quality mode in accordance with the predicted timing. The posture information HPI of the target TG is extracted from the moving image data MD acquired in the high image quality mode. Therefore, it is possible to extract the posture information HPI serving as a target to be analyzed with high accuracy while specifying the specific scene with a low processing load.

The scene extraction unit detects the switching to the specific scene based on the motion of the target TG when the target TG and the specific object OB are in a predetermined positional relationship or a change in the positional relationship between the target TG and the specific object OB.

According to this configuration, the specific scene is detected with higher accuracy than a case in which the specific scene is detected only based on a relative positional relationship between the skeletons.

The scene extraction unit 133 extracts the posture information LPI of the target TG using the analysis model (the first analysis model 143) having lower posture estimation accuracy than that of the analysis model (the second analysis model 297) used in the posture information extraction unit 214. The scene extraction unit 133 detects the switching to the specific scene based on the change in the posture of the target TG estimated from the extracted posture information LPI.

According to this configuration, the motion of the target TG is estimated quickly and at low cost using the simple first analysis model 143. Accurate motion analysis is not required if only a specific scene is detected. By causing the posture estimation accuracy of the second analysis model 297 used when detailed motion analysis is performed to be different from that of the first analysis model 143 used for determination of a specific scene, efficient motion analysis is performed at low cost.

The information processing system 1 includes the image capturing condition determination unit 132. The image capturing condition determination unit 132 determines the image capturing direction of the target TG at the time of acquiring the moving image data MD based on the type of the motion serving as a target of the motion analysis.

According to this configuration, the moving image data MD suitable for the motion analysis can be easily obtained.

The state machine 221 detects a plurality of phases included in the series of motions based on the posture information HPI acquired from a plurality of directions.

According to this configuration, missing of information due to occlusion or the like hardly occurs. Therefore, the motion analysis with high accuracy is performed.

The motion analysis unit 222 scores the motion of each phase based on one or more scoring items set for each phase. The motion analysis unit 222 generates the analysis information MAI indicating the evaluation result of the series of motions based on the scoring result of each phase.

According to this configuration, the entire series of motions is accurately and objectively evaluated.

The information processing system 1 includes the output unit 134. For example, the output unit 134 temporarily stops the movement of the target TG for each phase, and displays the analysis information MAI together with the still image IM of the target TG in the phase.

According to this configuration, the analysis result is provided in a mode linked to the playback scene of the moving image. Therefore, the motion of the target TG to be focused on and the analysis result thereof can be efficiently grasped.

The analysis information MAI includes information indicating comparison with a target motion.

According to this configuration, a type of motion performed by the target TG is easily grasped based on the comparison with the target motion.

The analysis information MAI includes the skeleton information SI of the target TG and the reference skeleton information RSI serving as a reference for comparison.

According to this configuration, it is easy to grasp a difference between the motion of the target TG and the target motion.

The output unit selectively displays information on the skeleton corresponding to a portion of the target TG to be analyzed in the phase as the skeleton information SI of the target TG and the reference skeleton information RSI.

According to this configuration, information on the skeleton to be focused on can be easily grasped.

The output unit displays the skeleton information SI of the target TG and the reference skeleton information RSI at a timing when a difference exceeding an allowable reference is generated between the skeleton information SI of the target TG and the reference skeleton information RSI.

According to this configuration, the phase of the motion deviating from the target motion can be easily grasped.

The output unit highlights and displays a portion of the skeleton of the target TG, in which the portion is a portion at which the skeleton information SI of the target TG and the reference skeleton information RSI are different from each other beyond the allowable reference.

According to this configuration, the skeleton of the portion at which a deviation from the target motion occurs is easily grasped.

The analysis information MAI includes the information indicating a guideline for bringing the motion of the target TG closer to the target motion.

According to this configuration, it is possible to encourage the target TG to improve the motion thereof based on the guideline.

The analysis information MAI includes information indicating comparison with the past motion of the target TG.

According to this configuration, the situation of improvement of the motion can be easily grasped.

The analysis information MAI includes the current skeleton information SI of the target TG and the past skeleton information SI of the target TG serving as a reference for comparison.

According to this configuration, the portion of the motion to be improved can be easily grasped.

The output unit 134 displays the current skeleton information SI of the target TG and the past skeleton information SI of the target TG at a timing when a difference exceeding an allowable reference is generated between the current skeleton information SI of the target TG and the reference skeleton information RSI indicating the target motion.

According to this configuration, a timing at which a deviation from the target motion occurs is easily grasped.

The output unit 134 highlights and displays a portion of the skeleton of the target TG, in which the portion is a portion at which the current skeleton information SI of the target TG and the reference skeleton information RSI are different from each other beyond the allowable reference.

According to this configuration, the portion of the motion to be improved can be easily grasped.

The analysis information MAI includes information indicating the transition of the scoring result for each scoring item of each phase from the past to the present.

According to this configuration, the situation of improvement of the motion can be easily grasped.

The information processing system 1 includes the intervention information generation unit 230. The intervention information generation unit 230 generates the intervention information VI for the target TG based on the analysis information MAI.

According to this configuration, it is possible to actively participate in the improvement of the motion of the target TG.

The intervention information VI includes determination information serving as a determination material to encourage the target TG to improve the motion thereof, or a training plan of the target TG.

According to this configuration, the guideline to improve the motion can be presented to the target TG.

The intervention information generation unit 230 generates authentication information to authenticate the current level of the target TG.

According to this configuration, the level of the target TG is objectively grasped based on the authentication information.

The state machine 221 detects a plurality of phases based on the determination method for each phase stored in the index database 295. The motion analysis unit 222 analyzes the motion of the target TG for each phase based on the scoring item and the scoring reference for each phase stored in the index database 295. The index database 295 stores one or more pieces of information on the image capturing condition of the moving image, the phase definition, the specific scene serving as a target to be analyzed, the scoring item, and the scoring reference for each determination item as an index of motion analysis. The determination item is associated with the type of exercise serving as target of motion analysis. The motion analysis unit 222 transmits the evaluation result of the series of motions to a terminal or a server owned by an intervener (a trainer, a family member, a service provider, or the like) who intervenes in the target TG. According to this configuration, accurate analysis and intervention can be performed.

It is noted that the effects described in the present specification are merely examples and are not limited, and other effects may be obtained.

Supplementary Note

It is noted that the present technology can also have the following configurations.

(1)

An information processing system comprising:

a state machine configured to detect, based on posture information on a target extracted from moving image data, a plurality of phases included in a series of motions of the target; and a motion analysis unit configured to analyze, by using the posture information, the motion of the target for each phase.

(2)

The information processing system according to (1), comprising:

a scene extraction unit configured to extract, from the moving image data, one or more specific frame images for each phase, the one or more specific frame images indicating a specific scene according to the phase; and a posture information extraction unit configured to extract, from the one or more specific frame images, the posture information on the target for each frame image.

(3)

The information processing system according to (2), wherein the scene extraction unit is configured to: detect switching to the specific scene based on a posture analysis result of a frame image group before the specific scene; and extract, as the one or more specific frame images, one or more frame images having higher resolution than resolution of the frame image group, the one or more frame images being acquired according to the switching to the specific scene.

(4)

The information processing system according to (3), wherein the scene extraction unit is configured to detect the switching to the specific scene based on the motion of the target when the target and a specific object are in a predetermined positional relationship or a change in the positional relationship between the target and the specific object.

(5)

The information processing system according to (3) or (4), wherein the scene extraction unit is configured to: extract the posture information on the target by using an analysis model having lower posture estimation accuracy than posture estimation accuracy of an analysis model used by the posture information extraction unit; and detect the switching to the specific scene based on a change in a posture of the target, the posture being estimated from the extracted posture information.

(6)

The information processing system according to any one of (1) to (5), comprising an image capturing condition determination unit configured to determine, based on a type of the motion serving as a motion analysis target, an image capturing direction of the target when the moving image data is acquired.

(7)

The information processing system according to (6), wherein the state machine is configured to detect, based on the posture information acquired from a plurality of directions, the plurality of phases included in the series of motions.

(8)

The information processing system according to any one of (1) to (7), wherein the motion analysis unit is configured to: score the motion of each phase based on one or more scoring items set for each phase; and generate, based on a scoring result of each phase, analysis information indicating an evaluation result of the series of motions.

(9)

The information processing system according to (8), comprising an output unit configured to pause movement of the target for each phase and to display the analysis information together with a still image of the target in the phase.

(10)

The information processing system according to (9), wherein the analysis information includes information indicating comparison with a target motion.

(11)

The information processing system according to (10), wherein the analysis information includes skeleton information on the target and reference skeleton information serving as a reference of the comparison.

(12)

The information processing system according to (11), wherein the output unit is configured to selectively display, as the skeleton information on the target and the reference skeleton information, information on a skeleton corresponding to a portion of the target to be analyzed in the phase.

(13)

The information processing system according to (11) or (12), wherein the output unit is configured to display the skeleton information on the target and the reference skeleton information at a timing when a difference exceeding an allowable reference is generated between the skeleton information on the target and the reference skeleton information.

(14)

The information processing system according to any one of (11) to (13), wherein the output unit is configured to highlight and display a portion of a skeleton of the target, the portion being a portion at which the skeleton information on the target and the reference skeleton information are different from each other beyond an allowable reference.

(15)

The information processing system according to any one of (10) to (14), wherein the analysis information includes information indicating a guideline to bring the motion of the target close to the target motion.

(16)

The information processing system according to any one of (9) to (15), wherein the analysis information includes information indicating comparison with a past motion of the target.

(17)

The information processing system according to (16), wherein the analysis information includes current skeleton information on the target and past skeleton information on the target, the past skeleton information serving as a reference of the comparison.

(18)

The information processing system according to (17), wherein the output unit is configured to display the current skeleton information on the target and the past skeleton information on the target at a timing when a difference exceeding an allowable reference is generated between the current skeleton information on the target and reference skeleton information indicating a target motion.

(19)

The information processing system according to (18), wherein the output unit is configured to highlight and display a portion of a skeleton of the target, the portion being a portion at which the current skeleton information on the target and the reference skeleton information are different from each other beyond the allowable reference.

(20)

The information processing system according to any one of (8) to (19), wherein the analysis information includes information indicating a transition of a scoring result for each scoring item of each phase from the past to the present.

(21)

The information processing system according to any one of (8) to (20), comprising an intervention information generation unit configured to generate intervention information for the target based on the analysis information.

(22)

The information processing system according to (21), wherein the intervention information includes determination information serving as a determination material used to encourage the target to improve the motion or a training plan of the target.

(23)

The information processing system according to (21) or (22), wherein the intervention information generation unit is configured to generate authentication information used to authenticate a current level of the target.

(24)

The information processing system according to any one of (1) to (23), wherein the state machine is configured to detect the plurality of phases based on a determination method for each phase stored in an index database.

(25)

The information processing system according to (24), wherein the motion analysis unit is configured to analyze the motion of the target for each phase based on a scoring item for each phase stored in the index database and a scoring reference.

(26)

The information processing system according to (24) or (25), wherein the index database stores, as an index of motion analysis, one or more pieces of information among an image capturing condition of a moving image, a phase definition, a specific scene serving as a target to be analyzed, a scoring item, and a scoring reference for each determination item.

(27)

The information processing system according to (26), wherein the determination item is associated with a type of exercise serving as a target of the motion analysis.

(28)

The information processing system according to any one of (1) to (27), wherein the motion analysis unit is configured to transmit an evaluation result of the series of motions to a terminal or a server owned by an intervener who intervenes in the target.

(29)

An information processing method executed by a computer, the information processing method comprising:

detecting, based on posture information on a target extracted from moving image data, a plurality of phases included in a series of motions of the target; and analyzing, by using the posture information, the motion of the target for each phase.

(30)

A program for causing a computer to implement:

detecting, based on posture information on a target extracted from moving image data, a plurality of phases included in a series of motions of the target; and analyzing, by using the posture information, the motion of the target for each phase.

REFERENCE SIGNS LIST 1, 1A, 1B INFORMATION PROCESSING SYSTEM
132 IMAGE CAPTURING CONDITION DETERMINATION UNIT
133 SCENE EXTRACTION UNIT
134 OUTPUT UNIT
143 FIRST ANALYSIS MODEL
214 POSTURE INFORMATION EXTRACTION UNIT
221 STATE MACHINE
222 MOTION ANALYSIS UNIT
230 INTERVENTION INFORMATION GENERATION UNIT
297 SECOND ANALYSIS MODEL
FI, SFI FRAME IMAGE
IM STILL IMAGE
LPI, HPI POSTURE INFORMATION
MAI ANALYSIS INFORMATION
MD MOVING IMAGE DATA
OB OBJECT
RSI REFERENCE SKELETON INFORMATION
SI SKELETON INFORMATION
TG TARGET
VI INTERVENTION INFORMATION

The invention claimed is:

1. An information processing system comprising:

circuitry configured to implement a state machine configured to detect, based on posture information on a target extracted from moving image data, a plurality of phases included in a series of motions of the target;

a motion analysis unit configured to analyze, by using the posture information, the motion of the target for each phase;

a scene extraction unit configured to extract, from the moving image data, one or more specific frame images for each phase, the one or more specific frame images indicating a specific scene according to the phase; and a posture information extraction unit configured to extract, from the one or more specific frame images, the posture information on the target for each frame image, wherein the scene extraction unit is configured to detect switching to the specific scene based on a posture analysis result of a frame image group before the specific scene, and extract, as the one or more specific frame images, one or more other frame images acquired according to the switching to the specific scene, and the analysis information includes skeleton information on the target and reference skeleton information serving as a reference of the comparison.

2. The information processing system according to claim 1, wherein the one or more other frame images having higher resolution than resolution of the frame image group.

3. The information processing system according to claim 2, wherein the scene extraction unit is configured to detect the switching to the specific scene based on the motion of the target when the target and a specific object are in a predetermined positional relationship or a change in the positional relationship between the target and the specific object.

4. The information processing system according to claim 2, wherein the scene extraction unit is configured to: extract the posture information on the target by using an analysis model having lower posture estimation accuracy than posture estimation accuracy of an analysis model used by the posture information extraction unit; and detect the switching to the specific scene based on a change in a posture of the target, the posture being estimated from the extracted posture information.

5. The information processing system according to claim 1, wherein the circuitry is further configured to implement an image capturing condition determination unit configured to determine, based on a type of the motion serving as a motion analysis target, an image capturing direction of the target when the moving image data is acquired.

6. The information processing system according to claim 5, wherein the state machine is configured to detect, based on the posture information acquired from a plurality of directions, the plurality of phases included in the series of motions.

7. The information processing system according to claim 1, wherein the motion analysis unit is configured to: score the motion of each phase based on one or more scoring items set for each phase; and generate, based on a scoring result of each phase, analysis information indicating an evaluation result of the series of motions.

8. The information processing system according to claim 7, comprising an output unit configured to pause movement of the target for each phase and to display the analysis information together with a still image of the target in the phase.

9. The information processing system according to claim 8, wherein the analysis information includes information indicating comparison with a target motion.

10. The information processing system according to claim 9, wherein the analysis information includes information indicating a guideline to bring the motion of the target close to the target motion.

11. The information processing system according to claim 8, wherein the analysis information includes information indicating comparison with a past motion of the target.

12. The information processing system according to claim 11, wherein the analysis information includes current skeleton information on the target and past skeleton information on the target, the past skeleton information serving as a reference of the comparison.

13. The information processing system according to claim 12, wherein the output unit is configured to display the current skeleton information on the target and the past skeleton information on the target at a timing when a difference exceeding an allowable reference is generated between the current skeleton information on the target and reference skeleton information indicating a target motion.

14. The information processing system according to claim 13, wherein the output unit is configured to highlight and display a portion of a skeleton of the target, the portion being a portion at which the current skeleton information on the target and the reference skeleton information are different from each other beyond the allowable reference.

15. The information processing system according to claim 7, wherein the analysis information includes information indicating a transition of a scoring result for each scoring item of each phase from the past to the present.

16. The information processing system according to claim 7, comprising an intervention information generation unit configured to generate intervention information for the target based on the analysis information.

17. The information processing system according to claim 16, wherein the intervention information includes determination information serving as a determination material used to encourage the target to improve the motion or a training plan of the target.

18. The information processing system according to claim 16, wherein the intervention information generation unit is configured to generate authentication information used to authenticate a current level of the target.

19. The information processing system according to claim 1, wherein the output unit is configured to selectively display, as the skeleton information on the target and the reference skeleton information, information on a skeleton corresponding to a portion of the target to be analyzed in the phase.

20. The information processing system according to claim 1 wherein the output unit is configured to display the skeleton information on the target and the reference skeleton information at a timing when a difference exceeding an allowable reference is generated between the skeleton information on the target and the reference skeleton information.

21. The information processing system according to claim 1 wherein the output unit is configured to highlight and display a portion of a skeleton of the target, the portion being a portion at which the skeleton information on the target and the reference skeleton information are different from each other beyond an allowable reference.

22. The information processing system according to claim 1, wherein the state machine is configured to detect the plurality of phases based on a determination method for each phase stored in an index database.

23. The information processing system according to claim 22, wherein the motion analysis unit is configured to analyze the motion of the target for each phase based on a scoring item for each phase stored in the index database and a scoring reference.

24. The information processing system according to claim 22, wherein the index database stores, as an index of motion analysis, one or more pieces of information among an image capturing condition of a moving image, a phase definition, a specific scene serving as a target to be analyzed, a scoring item, and a scoring reference for each determination item.

25. The information processing system according to claim 24, wherein the determination item is associated with a type of exercise serving as a target of the motion analysis.

26. The information processing system according to claim 1, wherein the motion analysis unit is configured to transmit an evaluation result of the series of motions to a terminal or a server owned by an intervener who intervenes in the target.

27. An information processing method executed by a computer, the information processing method comprising:

detecting, based on posture information on a target extracted from moving image data, a plurality of phases included in a series of motions of the target;

analyzing, by using the posture information, the motion of the target for each phase;

extracting, from the moving image data, one or more specific frame images for each phase, the one or more specific frame images indicating a specific scene according to the phase; and extracting, from the one or more specific frame images, the posture information on the target for each frame image, wherein the extracting one or more specific frame images for each phase includes detecting switching to the specific scene based on a posture analysis result of a frame image group before the specific scene, and extracting, as the one or more specific frame images, one or more other frame images acquired according to the switching to the specific scene, and the analysis information includes skeleton information on the target and reference skeleton information serving as a reference of the comparison.

28. A non-transitory computer readable storage having instructions contained therein that when executed by a processor cause the processor to perform a method, the method comprising:

detecting, based on posture information on a target extracted from moving image data, a plurality of phases included in a series of motions of the target; and analyzing, by using the posture information, the motion of the target for each phase;

extracting, from the moving image data, one or more specific frame images for each phase, the one or more specific frame images indicating a specific scene according to the phase; and extracting, from the one or more specific frame images, the posture information on the target for each frame image, wherein the extracting one or more specific frame images for each phase includes detecting switching to the specific scene based on a posture analysis result of a frame image group before the specific scene, and extracting, as the one or more specific frame images, one or more other frame images acquired according to the switching to the specific scene, and the analysis information includes skeleton information on the target and reference skeleton information serving as a reference of the comparison.

* * * * *